United States Patent
Mori

(10) Patent No.: US 8,421,902 B2
(45) Date of Patent: *Apr. 16, 2013

(54) DISPLAY PROCESSING APPARATUS AND METHOD, AND RECORDING MEDIUM

(75) Inventor: Naomi Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/473,084

(22) Filed: May 16, 2012

(65) Prior Publication Data

US 2012/0224092 A1 Sep. 6, 2012

Related U.S. Application Data

(63) Continuation of application No. 12/535,582, filed on Aug. 4, 2009, now Pat. No. 8,203,641.

(30) Foreign Application Priority Data

Aug. 8, 2008 (JP) ................................ 2008-205980

(51) Int. Cl.
*H04N 5/222* (2006.01)

(52) U.S. Cl.
USPC .................................................... 348/333.12

(58) Field of Classification Search ............ 348/333.04, 348/333.12, 333.02, 333.03; 396/222, 223, 396/290, 287

See application file for complete search history.

(56) References Cited

U.S. PATENT DOCUMENTS

| | | | | | |
|---|---|---|---|---|---|
| 5,359,385 | A | * | 10/1994 | Ishida et al. | 396/49 |
| 5,546,159 | A | * | 8/1996 | Imura et al. | 396/52 |
| 5,678,079 | A | * | 10/1997 | Ogawa | 396/234 |
| 5,774,746 | A | * | 6/1998 | Kirigaya et al. | 396/49 |
| 6,055,379 | A | * | 4/2000 | Tohyama | 396/161 |
| 7,110,032 | B2 | * | 9/2006 | Furukawa | 348/333.02 |
| 7,830,441 | B2 | * | 11/2010 | Tsukatani | 348/333.11 |
| 8,203,641 | B2 | * | 6/2012 | Mori | 348/333.12 |
| 2007/0115383 | A1 | * | 5/2007 | Tsukatani | 348/333.11 |
| 2008/0036895 | A1 | * | 2/2008 | Kosaka | 348/333.01 |
| 2009/0021584 | A1 | * | 1/2009 | Aoyama | 348/180 |
| 2010/0033615 | A1 | * | 2/2010 | Mori | 348/333.12 |

* cited by examiner

*Primary Examiner* — Aung S Moe

(74) *Attorney, Agent, or Firm* — Cowan, Liebowitz & Latman, P.C.

(57) ABSTRACT

A display processing apparatus which makes it possible to set auto bracketing values while confirming a whole range of shooting conditions configurable for correction in which possible shooting condition corrections are taken into account. An exposure correction value is set based on an instruction from a user for correcting a preset value of exposure. Auto bracketing value auto bracketing shooting are set based on an instruction from the user. A process is carried out for displaying a scale for indicating values of the exposure correction value and the auto bracketing values, indicators indicative of a range of exposure correction values that can be set and are arranged in a manner associated with the scale, and indicators indicative of a range of auto bracketing values that can be set and are arranged in a manner associated with the scale and the first indicators.

13 Claims, 16 Drawing Sheets

FIG. 17G  FIG. 17H
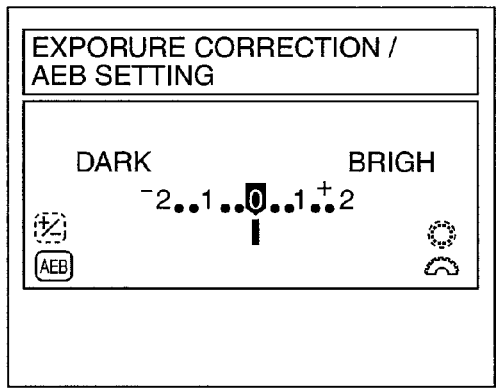 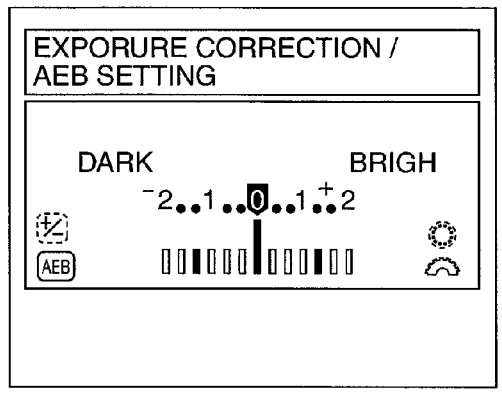
FIG. 17I
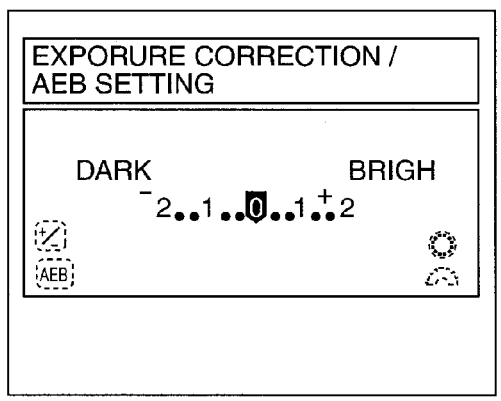
FIG. 18A  FIG. 18B
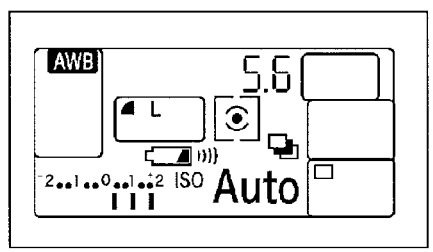 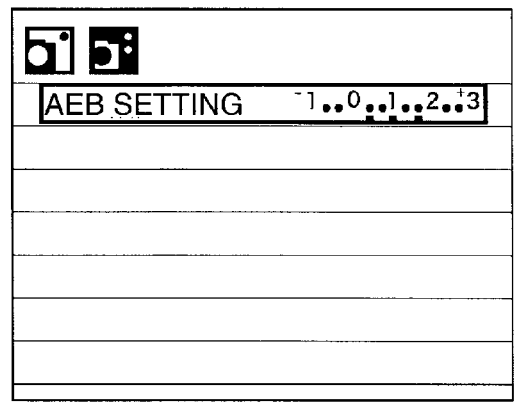

# DISPLAY PROCESSING APPARATUS AND METHOD, AND RECORDING MEDIUM

CROSS-REFERENCE TO RELATED APPLICATION

This application is a continuation of application Ser. No. 12/535,582, filed Aug. 4, 2009, the entire disclosure of which is hereby incorporated by reference.

BACKGROUND OF THE INVENTION

1. Field of the Invention

The present invention relates to a display processing apparatus and method related to an image pickup apparatus, such as a digital camera, and a recording medium, and more particularly to a technique of setting a value of shooting condition correction and auto bracketing values in the shooting condition correction.

2. Description of the Related Art

Conventionally, there has been developed an image pickup apparatus, such as a digital camera, which has a function of exposure correction for enabling a user to correct an appropriate exposure value automatically set by the image pickup apparatus. Further, there has been also developed an image pickup apparatus having an auto exposure bracketing function (AEB) which automatically corrects exposure values to be overexposed or to be underexposed with reference to an appropriate exposure value automatically set by the image pickup apparatus or an exposure correction value set by the user, and shoots a plurality of frames.

The image pickup apparatus of this kind, in general, is capable of setting an exposure correction value while referring to a display screen as shown in FIG. 18A, and setting auto bracketing values while referring to a display screen as shown in FIG. 18B.

Further, a technique has been developed which makes it possible to instantly confirm exposure correction information and auto bracketing steps corresponding to all the number of times of auto bracketing shooting, by displaying instructing portions for the exposure correction information and instructing portions for all the bracketing steps in association with each other (see Japanese Patent Registration Publication No. 2646491).

However, in the technique according to Japanese Patent Registration Publication No. 2646491, in setting auto bracketing values, it is impossible to perform the setting while confirming a whole range of exposure configurable for correction in which possible exposure corrections are taken into account, which is inconvenient to the user.

A similar problem to the above occurs not only in the auto exposure bracketing function concerning exposure correction but also in an auto exposure bracketing function in which a plurality of frames are automatically shot while correcting appropriate preset values concerning various shooting conditions, such as lighting control, shutter speed, a diaphragm value, white balance, ISO speed, etc.

SUMMARY OF THE INVENTION

The present invention provides a display processing apparatus and method which makes it possible to set auto bracketing values while confirming a whole range of shooting conditions configurable for correction in which possible shooting condition corrections are taken into account.

In a first aspect of the present invention, there is provided a display processing apparatus comprising a correction setting unit adapted to set a value of specific shooting configuration to a correction value corrected based on an instruction from a user, an auto bracketing value-setting unit adapted to set auto bracketing values in auto bracketing shooting based on an instruction from the user, and a display processing unit adapted to carry out a process for displaying a scale for indicating values set by the correction setting unit and the auto bracketing value-setting unit, first indicators indicative of a range of values which can be set by the correction setting unit, which are arranged in a manner associated with the scale, and second indicators indicative of a range of values which can be set by the auto bracketing value-setting unit, which are arranged in a manner associated with the scale and the first indicators.

In a second aspect of the present invention, there is provided a display processing method comprising setting a value of specific shooting configuration to a correction value corrected based on an instruction from a user, setting auto bracketing values in auto bracketing shooting based on an instruction from the user, and carrying out a process for displaying a scale for indicating values set by the setting of the correction value and the setting of auto bracketing values, first indicators indicative of a range of values which can be set by the setting of the correction value, which are arranged in a manner associated with the scale, and second indicators indicative of a range of values which can be set by the setting of the auto bracketing values, which are arranged in a manner associated with the scale and the first indicators.

In a third aspect of the present invention, there is provided a computer-readable recording medium storing a computer-executable program for causing a computer to function as a correction setting unit adapted to set a value of specific shooting configuration to a correction value corrected based on an instruction from a user, an auto bracketing value-setting unit adapted to set auto bracketing values in auto bracketing shooting based on an instruction from the user, and a display processing unit adapted to carry out a process for displaying a scale for indicating values set by the correction setting unit and the auto bracketing value-setting unit, first indicators indicative of a range of values which can be set by the correction setting unit, which are arranged in a manner associated with the scale, and second indicators indicative of a range of values which can be set by the auto bracketing value-setting unit, which are arranged in a manner associated with the scale and the first indicators.

According to the present invention, indicators indicative of all shooting condition correction values that can be set and indicators indicative of all auto bracketing values that can be set are displayed in a state in which scales of all values that can be set are associated with each other for using the shooting condition correction function and the auto exposure bracketing function in combination.

Therefore, it is possible to set the auto bracketing values while confirming the whole range of shooting conditions configurable for correction in which possible shooting condition corrections are taken into account.

The features and advantages of the invention will become more apparent from the following detailed description taken in conjunction with the accompanying drawings.

BRIEF DESCRIPTION OF THE DRAWINGS

FIGS. 17A to 17I are diagrams showing display variations of the exposure correction/AEB configuration screen.

FIGS. 18A and 18B are diagrams useful in explaining a conventional method of setting an exposure correction value and bracket values.

DETAILED DESCRIPTION OF THE EMBODIMENTS

Figure 1:
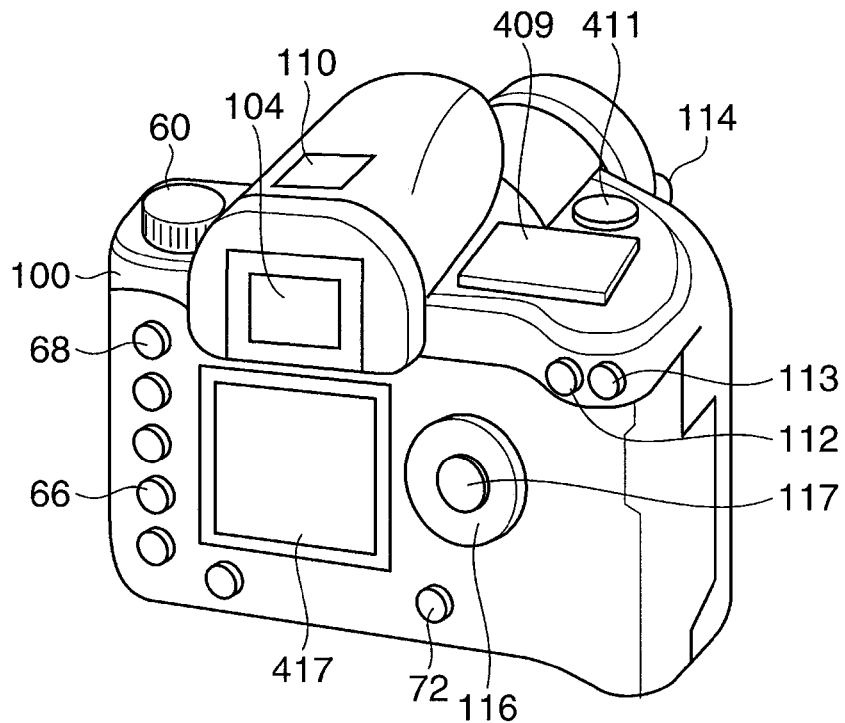
FIG. 1 is an appearance diagram of an image pickup apparatus (digital single-lens reflex camera) according to an embodiment of the present invention.
Figure 2:
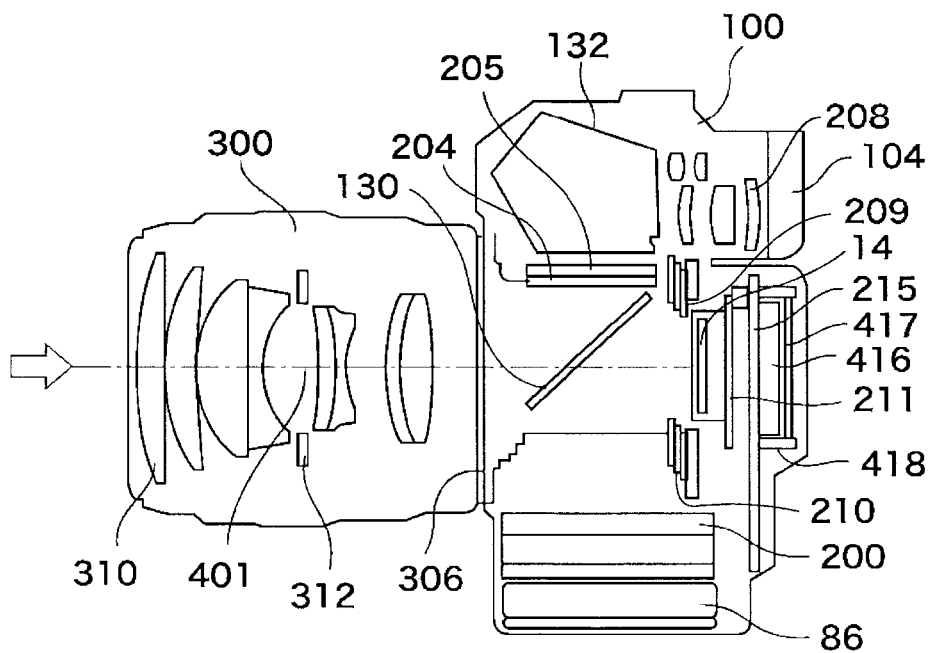
FIG. 2 is a diagram showing the internal configuration of the image pickup apparatus shown in FIG. 1.

The present invention will now be described in detail below with reference to the accompanying drawings showing embodiments thereof. FIG. 1 is an appearance diagram of an image pickup apparatus according to an embodiment of the present invention, and FIG. 2 is a diagram showing the internal configuration of the image pickup apparatus. The image pickup apparatus shown in FIGS. 1 and 2 is configured as a digital single-lens reflex camera (hereinafter referred to as "the camera main unit") 100.

The camera main unit 100 has an upper part provided with an accessory shoe 110, an optical viewfinder 104, an AE (automatic exposure) locking button 112, a focus detection range selection button 113, and a release button 114. The upper part of the camera main unit 100 is further provided with a main electronic dial 411, a mode dial 60, and an external display unit 409.

The AE (automatic exposure) locking button 112 is used, for example, for shooting by fixing the exposure value to an appropriate exposure value determined by spot metering. The focus detection range selection button 113 is used for selecting a focus detection range in AF (automatic focusing) control. The release button 114 is used for instructing an image pickup operation.

The main electronic dial 411 is used for inputting values associated with operations of the camera and for switching between image pickup modes, by being operated together with other operation buttons. The external display unit 409 is implemented e.g. by a liquid-crystal panel, and displays a shutter speed value, a diaphragm value, an image pickup mode, and other information.

The camera main unit 100 has a rear surface provided with an LCD unit 417, a reproducing button 66, a menu button 68, a sub electronic dial 116, an SET button 117, and a power switch 72. The rear surface of the camera main unit 100 is further provided with operating pieces, not shown, such as an arrow key and a multi controller.

The LCD unit 417 is used for displaying images (image data) obtained by shooting, various setting screens, and so forth. The LCD unit 417 is implemented by a transmissive LCD, and has a backlight 416 (see FIG. 2). The LCD unit 417 is also used as a display device for displaying a menu screen for designating selected ones of various settings and processes which can be set or processed by the present image pickup apparatus, and an exposure correction/AEB configuration screen (GUI screen: see FIG. 14), referred to hereinafter. The reproducing button 66 is used for reproducing and displaying shot images on the LCD unit 417.

The menu button 68 is used for displaying the menu screen for configuring various settings for the camera on the LCD unit 417. For example, in the case of setting a shooting mode, after pushing down the menu button 68, the sub electronic dial 116 is operated to select a desired mode, and the SET button 117 is pushed after selecting the desired mode, whereby the setting of the shooting mode is completed.

Figure 14:
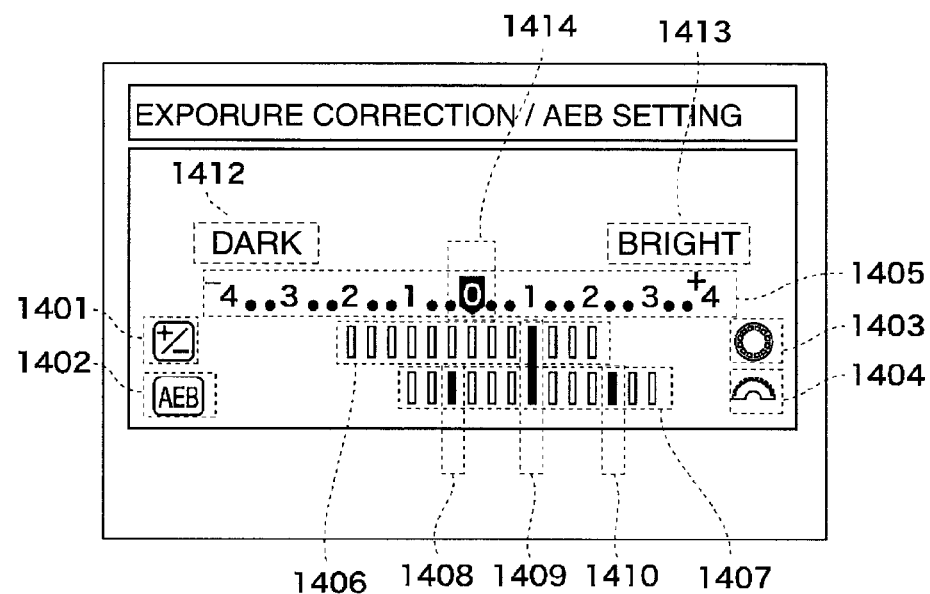
FIG. 14 is a diagram showing a representative example of the exposure correction/AEB configuration screen.

It should be noted that to switch the screen to the exposure correction/AEB configuration screen in FIG. 14, it is only required that after displaying the above-mentioned menu screen, the SET button 117 is pushed down in a state in which the exposure correction/AEB setting is selected using the sub electronic dial 116 and the main electronic dial 411.

Figure 3:
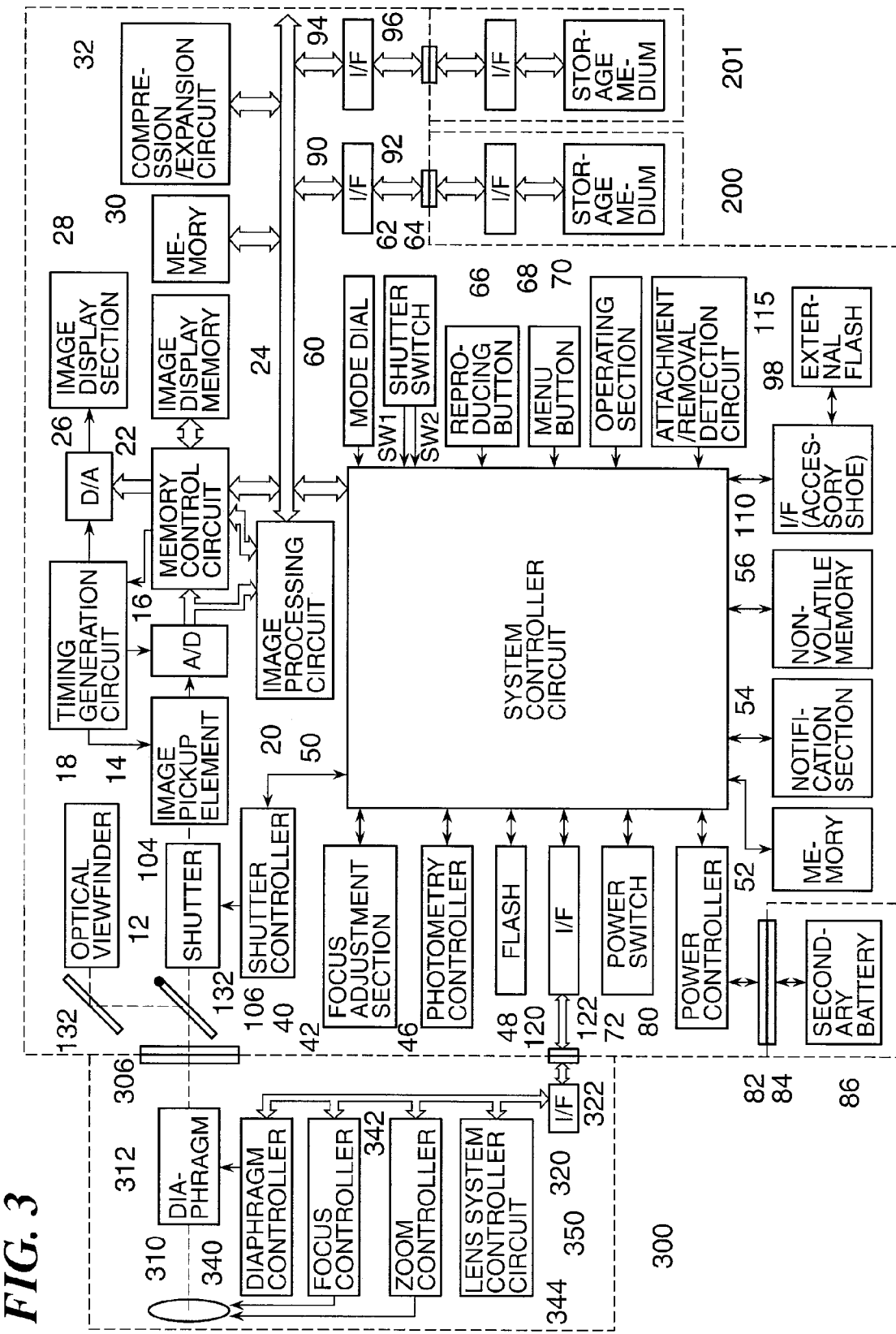
FIG. 3 is a block diagram showing a circuit configuration of the image pickup apparatus shown in FIG. 1.

The camera main unit 100 has a front surface provided with a mount 106 (see FIG. 3). To this mount 106, there is detachably connected a mount 306 provided on an interchangeable lens 300. In FIG. 2, a reference numeral 401 denotes an image pickup optical axis. The interchangeable lens 300 is provided with a lens unit 310 formed by a plurality of lenses and a diaphragm 312.

Further, a mirror 130 is disposed in an image pickup light path within the camera main unit 100. The mirror 130 is movable between a position (position shown in FIG. 2) at which the mirror 130 reflects object light from the lens unit 310 toward a viewfinder optical system, and a position at which the mirror 130 is retracted from the image pickup light path. An object image is formed on a focus board 204 by the object light reflected from the mirror 130.

A reference numeral 205 denotes a condenser lens for improving visibility of the viewfinder, and a reference mineral 132 denotes a pentagonal dach prism. The pentagonal dach prism 132 guides the object light passing through the focus board 204 and the condenser lens 205 to an eyepiece 208. These component elements, i.e. the focus board 204 to the eyepiece 208, form the optical viewfinder 104. The user can monitor the object image formed on the focus board 204 through the eyepiece 208.

Reference numerals 209 and 210 respectively denote a rear curtain and a fore curtain which form a focal-plane shutter 12 (see FIG. 3). By controlling the opening of the rear curtain 209 and that of the fore curtain 210, an image pickup element 14 is exposed for a required time period. The image pickup element 14 is implemented by a CCD sensor or a CMOS sensor, and has a front surface provided with an optical low-pass filter (not shown).

Further, the image pickup element 14 is connected to a printed circuit board 211. A display board 215 is disposed at a location rearward of the print circuit board 211. The LCD unit 417 and the backlight 416 are disposed on an surface of the display board 215 opposite from the print circuit board 211.

A reference numeral 200 denotes a storage device for storing image data obtained by the image pickup operation, and is comprised of a semiconductor memory, a hard disk or the like. A reference numeral 86 denotes a secondary battery. The storage device 200 and the secondary battery 86 are detachably attached to the camera main unit 100.

Next, a description will be given of a circuit configuration of the camera main unit 100 and the interchangeable lens 300 with reference to FIG. 3. In FIG. 3, the component elements shown in FIGS. 1 and 2 are denoted by the same reference numerals as those in FIGS. 1 and 2.

First, a description will be given of a circuit configuration within the interchangeable lens 300. The interchangeable lens 300 is provided with a connector 322 and an interface 320, for electrically connecting the interchangeable lens 300 to the camera main unit 100. The connector 322 and the interface 320 enables a lens system controller circuit 350 to communicate with a system controller circuit 50 within the camera main unit 100, referred to hereinafter, via a connector 122 and an interface 120 disposed in the camera main unit 100.

A diaphragm controller 340 controls the diaphragm 312, based on photometry information from a photometry controller 46, referred to hereinafter, in cooperation with a shutter controller 40. A focus controller 342 controls the focusing operation of the lens unit 310. A zoom controller 344 controls the zooming operation of the lens unit 310.

The lens system controller circuit 350 controls various overall operations of the interchangeable lens 300. The lens system controller circuit 350 is provided with a memory for storing constants, variables, and computer programs or the like for the various operations.

Next, a description will be given of the circuit configuration within the camera main unit 100. The object light passing through the lens unit 310 and the diaphragm 312 enters the image pickup element 14 through the focal-plane shutter 12 which is made open, in a state in which the mirror 130 is retracted from the image pickup light path (in a case where the mirror 130 is a half mirror, the mirror 130 remains disposed within the image pickup light path). The image pickup element 14 photoelectrically converts the object light incident thereonto an analog image signal, which is output therefrom.

An A/D converter 16 converts the analog image signal output from the image pickup element 14 to a digital signal. A timing generation circuit 18 supplies a clock signal and a control signal to the image pickup element 14, the A/D converter 16, and a D/A converter 26 under the control of a memory control circuit 22 and the system controller circuit 50.

An image processing circuit 20 carries out a pixel interpolation process and a color conversion process on the image data delivered from the A/D converter 16 or image data delivered from the memory control circuit 22. Further, the image processing circuit 20 carries out a predetermined computation process using the image data delivered from the A/D converter 16. Based on results of the predetermined computation process, the system controller circuit 50 carries out an automatic focusing (AF) process, an automatic exposure (AE) process, and a flash pre-emission (EF) process, based on a TTL method, for controlling the shutter controller 40 and a focus adjustment section 42.

Further, the image processing circuit 20 carries out a predetermined computation process using the image data delivered from the A/D converter 16, and also carries out an automatic white balancing process (AWB) by the TTL method, based on the results of the predetermined computation process.

The memory control circuit 22 controls the A/D converter 16, the timing generation circuit 18, the image processing circuit 20, an image display memory 24, the D/A converter 26, a memory 30, and a compression/expansion circuit 32. The image data output from the A/D converter 16 is written into the image display memory 24 or the memory 30 via the image processing circuit 20 and the memory control circuit 22, or only via the memory control circuit 22.

An image display section 28 successively displays an image signal which is converted to an analog signal by the D/A converter 26 and is written into the image display memory 24, on the LCD unit 417 shown in FIGS. 1 and 2, thereby realizing an electronic viewfinder (EVF) function. The image display section 28 turns on or off the electronic viewfinder (EVF) function in response to an instruction from the system controller circuit 50.

The memory 30 stores still images obtained by shooting. Further, the memory 30 is used as a frame buffer for images continuously written into the storage device 200 or an accessory device 201 at a predetermined rate during video shooting. The memory 30 is further used as a work area by the system controller circuit 50.

The compression/expansion circuit 32 compresses and expands image data using a known image compression method. The compression/expansion circuit 32 reads image data stored in the memory 30 to carry out compression processing or expansion processing thereon, and writes the processed image data into the memory 30 again.

The shutter controller 40 controls shutter speed of the focal plane shutter 12, while collaborating with the diaphragm controller 340, based on the photometry information from the photometry controller 46.

The focus adjustment section 42 carries out AF (automatic focus) processing by detecting a phase difference of the object image passing through the mirror 130, guided by a sub mirror, not shown. The photometry controller 46 carries out AE (automatic exposure) processing based on the output signal from a photometry sensor, not shown.

A flash 48 has functions of floodlighting of an AF fill light or flash lighting controlling. It should be noted that the photometry controller 46 carries out EF (flash lighting control) processing, collaborating with the flash 48.

The system controller circuit 50 includes a CPU and a memory, and totally controls operations of the camera main unit 100. A memory 52 stores a constant and a variable, and a computer program (basic program) or the like for operations of the system controller circuit 50.

A notification section 54 notifies to the outside of operating conditions of the camera and messages or the like by displaying characters and images by the LCD and LED 等 according to execution of the computer program in the system controller circuit 50, or making sounds from a speaker, not shown. The notification section 54 includes an LCD unit provided in the optical viewfinder 104, for displaying the diaphragm value, the shutter speed, focusing degree, warning about blurring and the exposure correction value.

A nonvolatile memory 56 is implemented e.g. by an EEPROM which is capable of electrically being deleted/recorded, and is used as a memory for storing computer programs or the like. In this case, of course, the computer programs are stored in the nonvolatile memory 56 in a manner computer-readable. This computer program contains application programs according to flowcharts in FIGS. 4 to 13, referred to hereinafter, which are configured to be computer-executable. The nonvolatile memory 56 further stores preset values set on the GUI screen such as the menu screen and the exposure correction/AEB configuration screen or the like, preset values set by the operations of the main electronic dial 411 and the sub electronic dial 116, and the shooting mode information designated by the operations of the mode dial 60.

A shutter switch (SW1) 62 is turned on by a first stroke operation (pressing halfway) of the release button 114, and instructs the system controller circuit 50 to start operations of AF processing, AE processing, AWB processing, and EF processing or the like. A shutter switch (SW2) 64 is turned on by a second stroke (fully pressing) of the release button 114, and instructs the system controller circuit 50 to start operations of a series of image pickup processing formed by exposure processing, development processing, and the recording processing.

The reproducing button 66 is operated for instructing the system controller circuit 50 to start a reproducing operation for reading out the image data associated with image pickup from the memory 30, or the storage device 200 and the other accessory device 201 and displaying the read image data on the image display section 28 (LCD unit 417.

The menu button 68 is operated for instructing the system controller circuit 50 to display the menu screen. The system controller circuit 50 receives the instruction for displaying the menu screen, creates the menu screen by reading out the shooting conditions from the nonvolatile memory 56, and displays the menu screen on the LCD unit 417.

An operating section 70 includes various buttons such as the reproducing button 66 and the menu button 68, and various dials such as the main electronic dial 411, the sub electronic dial 116, and the mode dial 60. The system controller circuit 50 performs the various operations according to signals from the operating section 70.

The power switch 72 switches on and off of the power of the camera main unit 100. Further, it is possible to switch on and off the power supply to the interchangeable lens 300, an external flash 115, and the storage device 200 which are connected to the camera main unit 100 by the operation of the power switch 72 at the same time.

A power controller 80 is formed by a battery detection circuit, a DC-DC converter, a switch circuit for switching blocks to be energized or the like. The power controller 80 detects whether or not a battery is mounted, a type of the battery, and the remaining battery capacity, controls the DC-DC converter based on the detection results and instructions from the system controller circuit 50, and supplies required voltages to the respective sections including the storage device 200 for required time periods.

Connectors 82 and 84 supply electrical power from the secondary battery 86 to the camera main unit 100, the interchangeable lens 300, the external flash 115, and the storage device 200. Reference numerals 90 and 94 denote interfaces of the storage device 200 and the accessory device 201, and 92 and 96 denotes connectors for connecting to the storage device 200 and the accessory device 201. A reference numeral 98 denotes an attachment/removal detection circuit for detecting whether or not the storage device 200 and/or the accessory device 201 are/is attached to the connectors 92 and 96.

Next, a description will be given of the exposure correction/AEB configuration screen displayed on the image display section 28 (LCD unit 417) with reference to FIGS. 14 to 16. The process for displaying the exposure correction/AEB configuration screen is carried out by the system controller circuit 50 which executes an application program therefor stored in the nonvolatile memory 56.

First, a configuration outline of the exposure correction/AEB configuration screen will be described with reference to FIG. 14. As shown in FIG. 14, a scale 1405, an exposure correction configurable range 1406, and an auto bracketing configurable range 1407 are displayed on the exposure correction/AEB configuration screen in a manner associated with one other.

The scale 1405 has markings indicative of all exposure values which can be set when the exposure correction function is used in combination with the auto exposure bracketing (AEB) function, using an appropriate exposure value calculated based on the photometry information by the system controller circuit 50, as a reference value (0) 1414.

Therefore, by displaying the scale 1405, the exposure correction configurable range 1406, and the auto bracketing configurable range 1407 in association with one other, it becomes possible to set auto bracketing values (a plurality of values in a range from an underexposure side to an overexposure side which are set when using the auto exposure bracketing function), while confirming the whole range of exposure configurable for correction in which possible exposure corrections are taken into account. In other words, it becomes possible to set auto bracketing values while confirming the whole range of shooting conditions configurable for correction in which possible shooting condition corrections are taken into account.

The above-mentioned scale 1405 is displayed in a manner fixed to a predetermined position of the AEB setting screen. However, the number of markings, i.e. the total number of exposure correction values that can be set differs depending on whether or not the AEB function is used. However, irrespective of whether the AEB function is used or not, the number of markings indicative of overexposure values is equal to the number of markings indicative of underexposure values.

Further, the reference value (0) 1414 corresponding to an appropriate exposure value is displayed in a particular manner different from the other exposure value so as to make it identifiable at a glance. Further, on the scale 1405, integer exposure values are indicated by respective numerals corresponding to the integer exposure values, and exposure values lower than the decimal point between successive integers exposure values are indicated by respective circles.

Further, a character string of "bright" is displayed over the markings of the overexposure values, as denoted by a reference numeral 1413, while a character string of "dark" is displayed over the markings of the underexposure values, as denoted by a reference numeral 1412. The displays of these character strings make it possible for the user to instantly recognize an effect of an exposure correction value and auto bracketing values to be set, without thinking.

For the exposure correction configurable range 1406, a plurality of rectangle-shaped indicators are displayed in a manner associated with the markings on the scale 1405, respectively. For the auto bracketing configurable range 1407, a plurality of rectangle-shaped indicators are displayed in a manner associated with the markings on the scale 1405 and the indicators in the exposure correction configurable range 1406, respectively.

If an exposure correction value is set (designated), an exposure correction cursor 1409 is displayed in a state illuminated on an indicator in the exposure correction configurable range 1406 corresponding to the set exposure correction value. Further, if auto bracketing values other than 0 are set (designated), bracket cursors 1408 and 1410 are displayed on indicators in the auto bracketing configurable range 1407 corresponding to respective auto bracketing values associated with the auto bracketing configuration. In this case, usually, two bracket cursors, i.e. the underexposed-side bracket cursor 1408 and the overexposed-side bracket cursor 1410 are displayed in an illuminated state.

It should be noted that if the auto bracketing values other than 0 are set (designated), the exposure correction cursor 1409 is displayed in a state illuminated in a manner overlapping an indicator in the center of the auto bracketing configurable range 1407. This means that the indicator in the center of the auto bracketing configurable range 1407 is always opposed to the indicator corresponding to the set exposure correction value, and is shifted in unison with the auto bracketing configurable range 1407 in accordance with a change in the exposure correction value caused by the setting. This shift makes it possible for the user to instantly realize how exposure values change as a whole according to the setting of auto bracketing values, when the auto bracketing values are set after setting the exposure correction value.

Further, in the vicinity (left-lateral position) of the display area of the exposure correction configurable range 1406, a "+/−" icon 1401 is displayed for guidance to advise the user that the indicators in the exposure correction configurable range 1406 are provided for the exposure correction.

Further, in the vicinity (right-lateral position) of the display area of the exposure correction configurable range 1406, an icon for guidance indicative of an operating piece for setting the exposure correction value, that is, a guidance icon 1403 having a shape of the sub electronic dial 116 is displayed. The guidance icon 1403 makes it possible for the user to easily realize that it is possible to designate (set) an indicator indicative of an exposure correction value by operating the sub electronic dial 116.

In the vicinity (left-lateral position) of the display area of the auto bracketing configurable range 1407, an "AEB" icon 1402 is displayed to advise the user that the indicators in the auto bracketing configurable range 1407 are associated with bracketing.

Further, in the vicinity (right-lateral position) of the display area of the auto bracketing configurable range 1407, a guidance icon 1404 having a shape of the main electronic dial 411 is displayed to indicate an operating piece for setting auto bracketing values. The guidance icon 1404 makes it possible for the user to easily realize that it is possible to designate (set) indicators indicative of auto bracketing values by operating the main electronic dial 411.

Next, a description will be given of the exposure correction/AEB configuration screen in a case where the auto bracketing values are equal to 0 with reference to FIG. 15.

If the auto bracketing values are equal to 0, i.e. if the auto exposure bracketing function is not used, the exposure correction is performed using only the exposure correction function. That is, if the auto exposure bracketing function is not actually used, all exposure values that can be set when using the exposure correction function and the auto bracketing (AEB) function in combination are only exposure values that can be set by the exposure correction function.

Figure 15A:
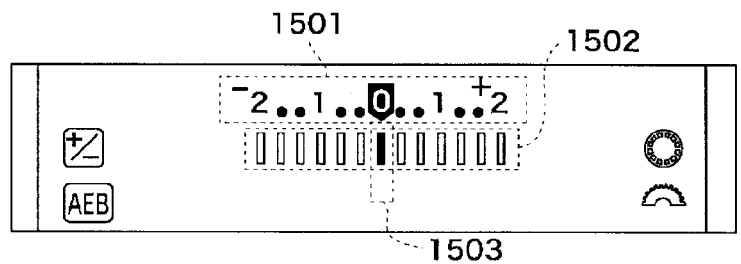
FIGS. 15A and 15B are diagrams useful in explaining an example of the exposure correction/AEB configuration screen in a case where the auto bracketing values are set to 0 and so as not to set auto bracketing (a case of performing only exposure correction).

Therefore, on the exposure correction/AEB configuration screen in the case where the auto bracketing values are equal to 0, as shown in FIG. 15A, only markings associated with the exposure values (−2EV to +2EV) which can be set by the exposure correction function are displayed on a scale 1501.

Further, if the auto bracketing values are equal to 0, the auto bracketing configurable range is not displayed, so that only indicators of the exposure correction configurable range 1502 are displayed. This makes it possible to reduce an erroneous operation in setting auto bracketing values, or useless operations in setting auto bracketing values, which are rejected as invalid.

Figure 15B:
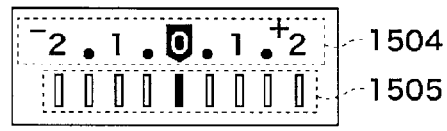

It should be noted that FIG. 15A shows the exposure correction/AEB configuration screen in a case where the number of steps for exposure correction is equal to ⅓ steps, and a scale 1504 and indicators of an exposure correction configurable range 1505 are displayed at intervals of ⅓ steps (the number of indicators corresponding to black circles between the integer exposure values are two). If the number of steps for exposure correction is equal to ½ steps, as shown in FIG. 15B, the scale 1504 and the above-mentioned indicators are displayed at intervals of ½ steps (the number of indicators corresponding to a black circle between the integer exposure values is one).

Next, a description will be given of the exposure correction/AEB configuration screen in a case where auto bracketing values are not equal to 0 with reference to FIG. 16.

If the auto bracketing values are not equal to 0, i.e. if the auto exposure bracketing function is used, the exposure correction is performed using both of the exposure correction function and the auto exposure bracketing function. Therefore, all exposure values that can be set when using the exposure correction function and the auto exposure bracketing (AEB) function in combination become equal to a sum of exposure values that can be set by the exposure correction function and exposure values that can be set by the auto exposure bracketing function.

Figure 16A:
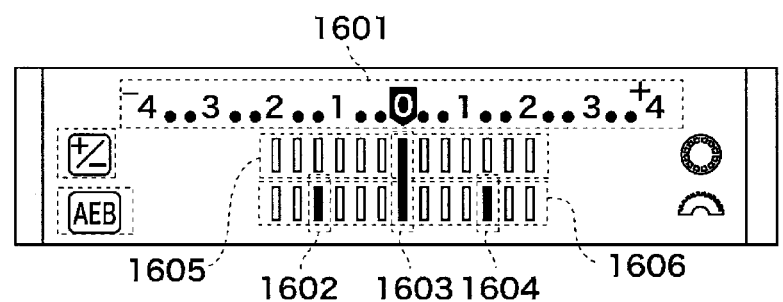
FIGS. 16A and 16B are diagrams useful in explaining an example of the exposure correction/AEB configuration screen in a case where auto bracketing values are set to values other than 0 so as to set the auto bracketing (a case of performing exposure correction and bracketing).

Therefore, on the exposure correction/AEB configuration screen in the case where the auto bracketing values are not equal to 0, as shown in FIG. 16A, markings associated with the exposure values (−4EV to +4EV) are displayed on a scale 1601. The exposure values (−4EV to +4EV) are the sum of the exposure values (−2EV to +2EV) which can be set by the exposure correction function and the exposure values (−2EV to +2EV) which can be set by the auto exposure bracketing function.

Figure 16B:
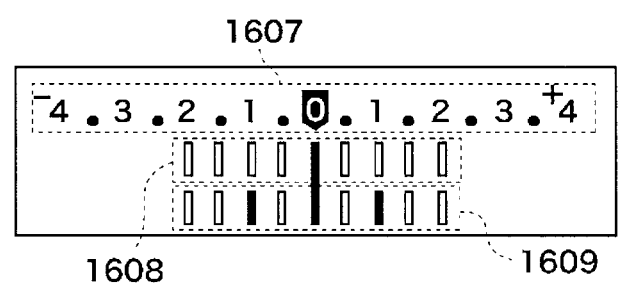

Further, in the case where the auto bracketing values are not equal to 0, indicators of an auto bracketing configurable range 1606 are also displayed with indicators of an exposure correction configurable range 1605. FIG. 16A shows the exposure correction/AEB configuration screen in the case where the number of steps for exposure correction is equal to ⅓ steps, and the scale 1601, the indicators in the exposure correction configurable range 1605, and the indicators in the auto bracketing configurable range 1606 are displayed in a manner arranged at intervals of ⅓ steps. If the number of steps for exposure correction is equal to ½ steps, as shown in FIG. 16B, the above-mentioned markings and indicators are displayed in a manner arranged at intervals of ½ steps.

Figure 4:
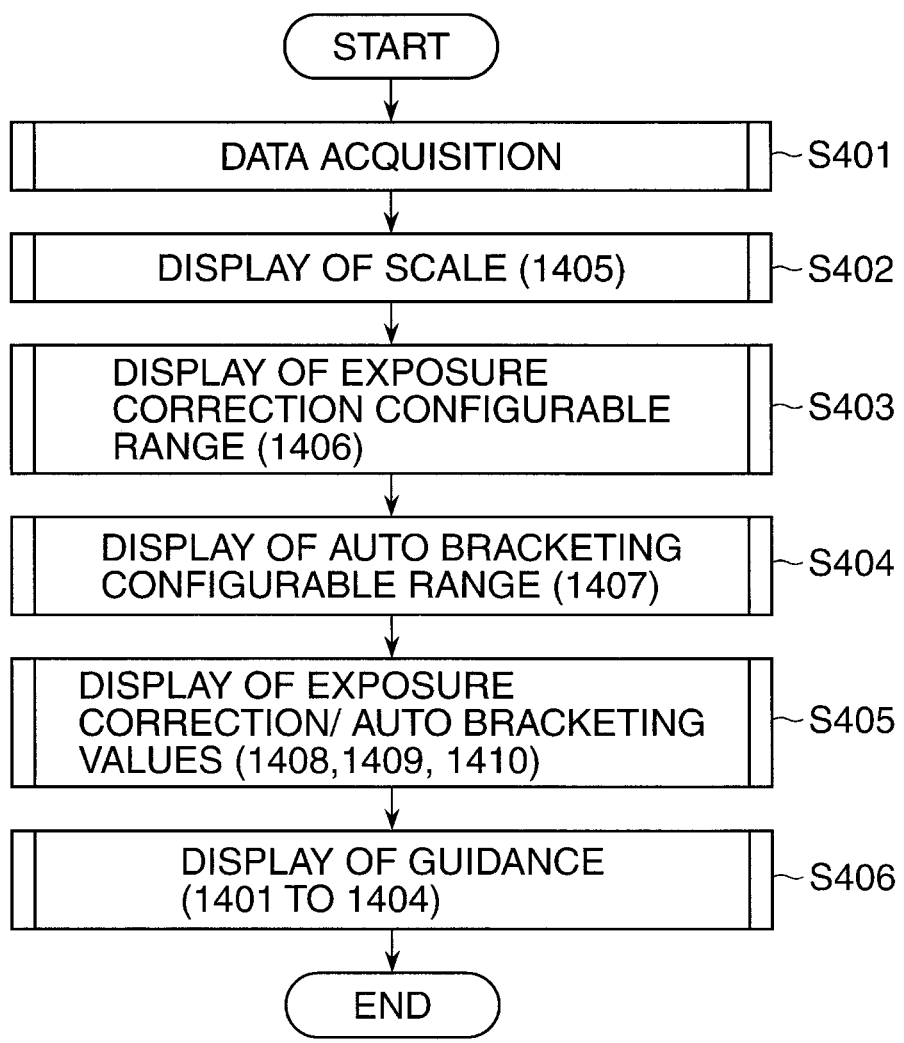
FIG. 4 is a flowchart of an outline of a process for displaying an exposure correction/AEB configuration screen.

Next, a description will be given of an outline of a process for displaying the exposure correction/AEB configuration screen with reference to a flowchart in FIG. 4. It should be noted that in the flowchart in FIG. 4, a numeral with an alphabet "S" such as S401 denotes a step number of the process. Further, details of processes in steps S401, S402, S403, S404, S405, and S406 in FIG. 4 will be described hereinafter with reference to flowcharts in FIGS. 5, 6, 7, 8, 9, and 10. Further, in FIGS. 4, 12, and 13, for reference numerals indicative of a scale and the like, the reference numerals in FIG. 14 are used for convenience. It should be noted that the process for displaying the exposure correction/AEB configuration screen is repeatedly executed at predetermined intervals in a state in which the SET button 117 is pushed down in a state in which the exposure correction/AEB setting is selected by the sub electronic dial 116 and the main electronic dial 411, and the display of the exposure correction/AEB configuration screen is set.

If the user instructs to set the exposure correction/AEB via the above-mentioned menu screen, the system controller circuit 50 acquires data required to display the exposure correction/AEB setting from the nonvolatile memory 56 (S401). The required data includes data of information on a shooting mode set by the user before issuing an instruction for setting the exposure correction/AEB and the number of steps for exposure correction, in addition to character pattern data associated with values, icon pattern data, and so forth. The required data further includes data of information on auto bracketing values, a shutter speed, a diaphragm value, and so forth which are calculated based on the photometry information by the system controller circuit 50.

Next, the system controller circuit 50 displays the scale 1405 based on the above-mentioned acquired data of information on the auto bracketing values, the number of correction steps, and so forth (S402). Next, the system controller circuit 50 displays the indicators in the exposure correction configurable range 1406, and the indicators in the auto bracketing configurable range 1407 (S403 and S404).

Next, the system controller circuit 50 displays the exposure correction cursor 1409 based on the exposure correction value calculated based on the shutter speed value and the diaphragm value, or the exposure correction value set by the user (S405). Further, the system controller circuit 50 displays the underexposed-side bracket cursor 1408 and the overexposed-side bracket cursor 1410 based on the auto bracketing values set by the user (S405).

Then, the system controller circuit 50 displays guidance information (S406), followed by terminating the process for displaying the exposure correction/AEB configuration screen. The guidance information to be displayed includes the "+/−" icon 1401, the "AEB" icon 1402, the guidance icons 1403 and 1404, the character strings "dark" 1412, and the "bright" 1413.

Next, a description will be given of details of a data acquisition process executed in the step S401 in FIG. 4 with reference to the flowchart in FIG. 5.

In the data acquisition process, the system controller circuit 50 reads an exposure correction value from the nonvolatile memory 56 (S501), reads auto bracketing values (S502), and reads the number of steps for exposure correction (S503).

Next, the system controller circuit 50 sets an exposure correction configuration permission flag for indicating whether or not to display indicators in the exposure correction configurable range 1406 to an initial value indicative of "permitted" (S504). Similarly, the system controller circuit 50 sets a bracketing configuration permission flag for indicating whether or not to display indicators in the auto bracketing configurable range 1407 to an initial value indicative of "permitted" (S505).

Next, the system controller circuit 50 determines a shooting mode (S506). As a result, if the shooting mode is "Bulb", i.e. a long-exposure mode, the bracketing configuration permission flag is reset to a value indicative of "inhibited" (S507). Then, the exposure correction configuration permission flag is reset to a value indicative of "inhibited" (S508), followed by terminating the data acquisition process.

As described above, the bracketing configuration permission flag and the exposure correction configuration permission flag are each set to the value indicative of "inhibited", and this causes the indicators in the exposure correction configurable range 1406 and the auto bracketing configurable range 1407 not to be displayed, and hence it becomes practically impossible to set the exposure correction value and the auto bracketing values.

If the shooting mode is "M", i.e. a manual mode, the system controller circuit 50 resets the exposure correction configuration permission flag to the value indicative of "inhibited" to make it impossible to set the exposure correction value (S508), followed by terminating the present process. Further, if the shooting mode is a mode other than "Bulb" and "M", the system controller circuit 50 determines whether or not the AEB shooting is being performed at present (S509).

As a result, if the AEB shooting is being performed, the system controller circuit 50 resets the exposure correction configuration permission flag to the value indicative of "inhibited" to make it impossible to set the exposure correction value (S508), followed by terminating the present process. On the other hand, the AEB shooting is not being carried out, the system controller circuit 50 terminates the present process without changing the above-mentioned two flags, thereby making it possible to set the exposure correction value and the auto bracketing values.

Figure 6:
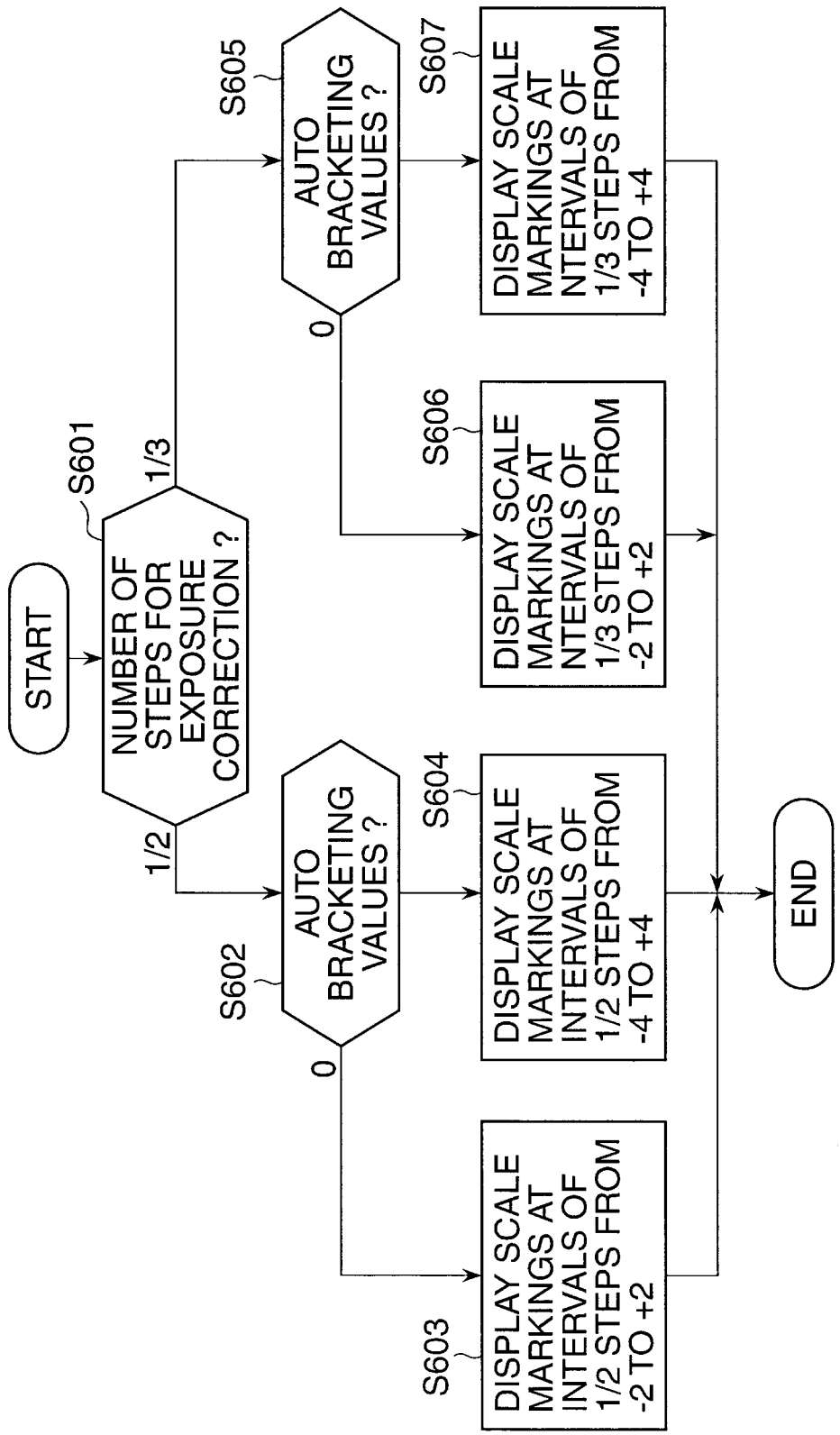
FIG. 6 is a flowchart of details of a scale-displaying process executed in FIG. 4.

Next, a description will be given of details of a scale-displaying process executed in the step S402 in FIG. 4 with reference to the flowchart in FIG. 6.

In the scale-displaying process, first, the system controller circuit 50 determines a number of steps for exposure correction (S601). If it is determined in the step S601 that the number of steps for exposure correction is equal to ½ steps, the system controller circuit 50 determines auto bracketing values (S602). If it is determined in the step S602 that the auto bracketing values are equal to 0, the system controller circuit 50 displays the markings at intervals of ½ steps within a range between −2(EV) to +2(EV) (S603), followed by terminating the scale-displaying process.

On the other hand, if it is determined in the step S602 that the auto bracketing values are not equal to 0, the system controller circuit 50 displays the markings at intervals of ½ steps within a range between −4(EV) to +4(EV) (S604), followed by terminating the scale-displaying process.

If it is determined in the step S601 that the number of steps for exposure correction is equal to ⅓ steps, the system controller circuit 50 determines auto bracketing values (S605). If it is determined in the step S605 that the auto bracketing values are equal to 0, the system controller circuit 50 displays the markings at intervals of ⅓ steps within the range between −2(EV) to +2(EV) (S606), followed by terminating the scale-displaying process.

On the other hand, if it is determined in the step S605 that the auto bracketing values are not equal to 0, the system controller circuit 50 displays the markings at intervals of ⅓ steps within the range between −4(EV) to +4(EV) (S607), followed by terminating the scale-displaying process.

Figure 7:
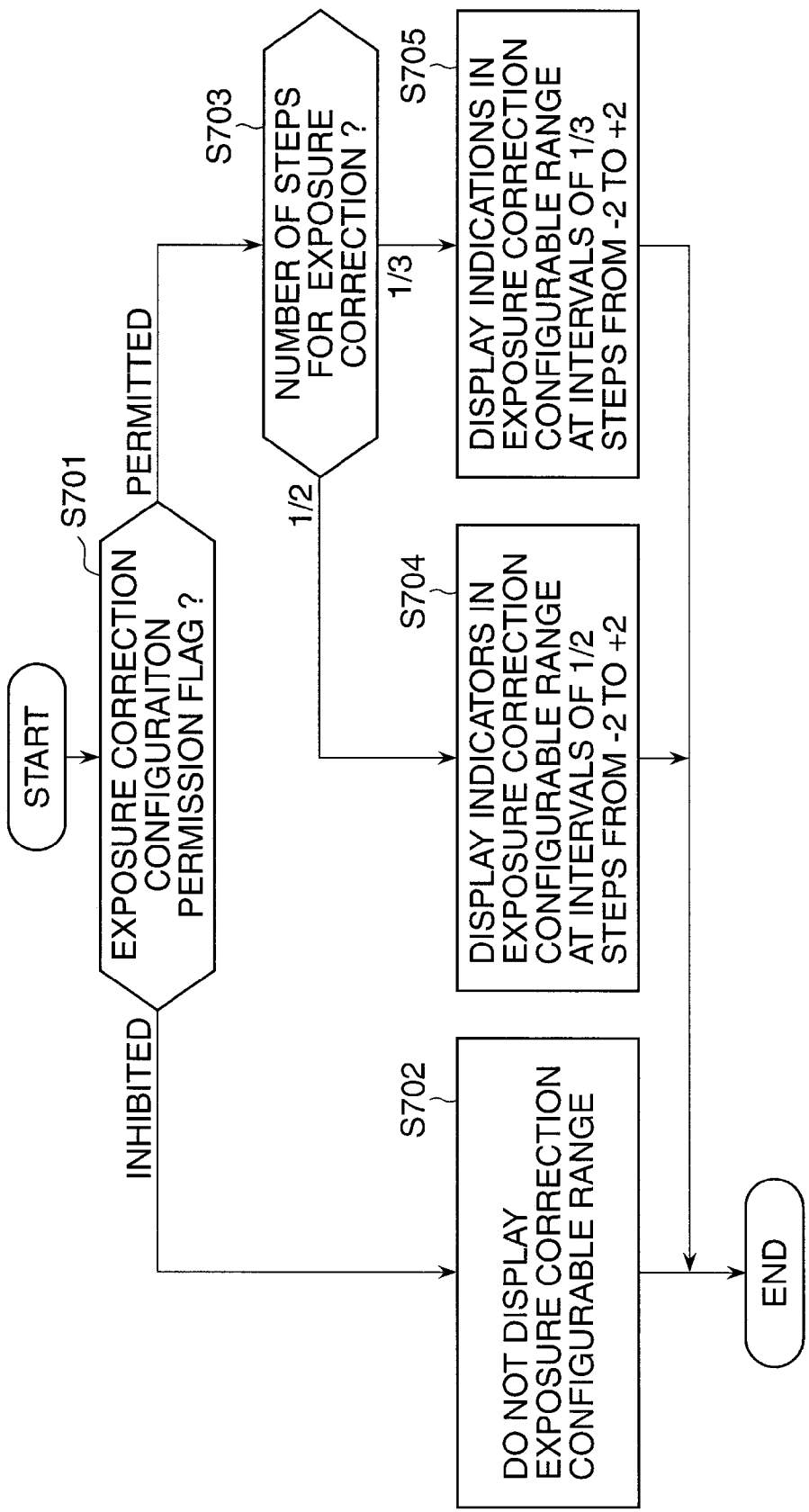
FIG. 7 is a flowchart of details of a process executed in FIG. 4, for displaying an exposure correction configurable range.

Next, a description will be given of details of a process executed in the step S403 in FIG. 4 for displaying the exposure correction configurable range with reference to the flowchart in FIG. 7.

In the process for displaying the exposure correction configurable range, the system controller circuit 50 determines a setting of the exposure correction configuration permission flag (S701). As a result, if the exposure correction configuration permission flag is equal to the value indicative of "inhibited", the system controller circuit 50 performs a special displaying in which the indicators in the exposure correction configurable range 1406 are not displayed (S702), followed by terminating the present displaying process.

On the other hand, if the exposure correction configuration permission flag is equal to the value indicative of "permitted", the system controller circuit 50 determines a number of steps for exposure correction (S703). As a result, if the number of steps for exposure correction is equal to ½ steps, the system controller circuit 50 displays the indicators in the exposure correction configurable range 1406 at intervals of ½ steps within the range between −2(EV) to +2(EV) (S704), followed by terminating the present displaying process.

On the other hand, if the number of steps for exposure correction is equal to ⅓ steps, the system controller circuit 50 displays the indicators in the exposure correction configurable range 1406 at intervals of ⅓ steps within the range between −2(EV) to +2(EV) (S705), followed by terminating the present displaying process.

Figure 8:
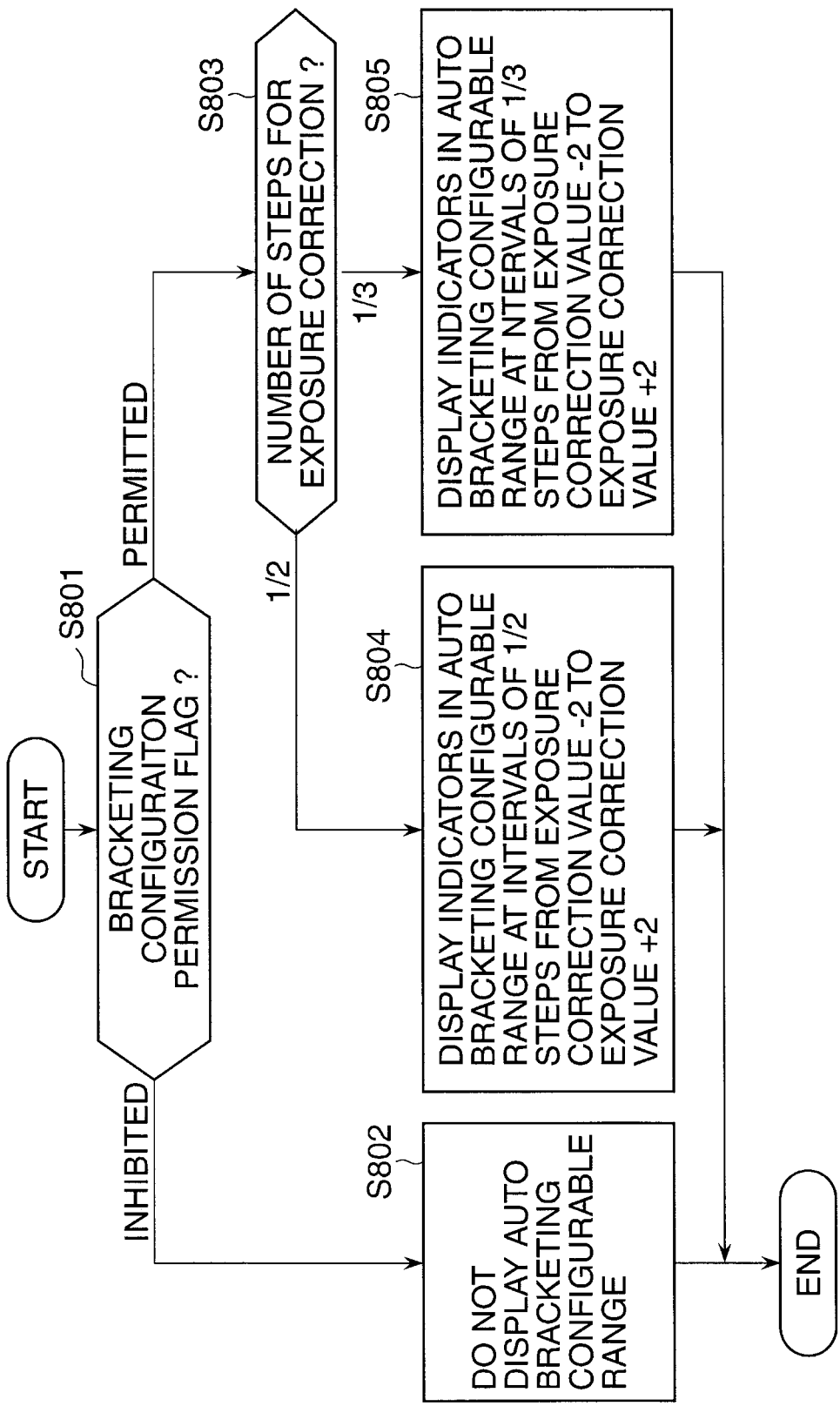
FIG. 8 is a flowchart of details of a process executed in FIG. 4, for displaying an auto bracketing configurable range.

Next, a description will be given of details of a process executed in the step S404 in FIG. 4 for displaying the auto bracketing configurable range with reference to the flowchart in FIG. 8.

In the process for displaying the auto bracketing configurable range, the system controller circuit 50 determines a setting of the bracketing configuration permission flag (S801). As a result, if the bracketing configuration permission flag is equal to the value indicative of "inhibited", the system controller circuit 50 performs a special display in which the indicators in the auto bracketing configurable range 1407 are not displayed (S802), followed by terminating the present displaying process.

On the other hand, if the bracketing configuration permission flag is equal to the value indicative of "permitted", the system controller circuit 50 determines a number of steps for exposure correction (S803). As a result, if the number of steps for exposure correction is equal to ½ steps, the system controller circuit 50 displays the indicators in the auto bracketing configurable range 1407 at intervals of ½ steps within a range between "the exposure correction value−2"(EV) to "the exposure correction value+2"(EV) (S804). After the system controller circuit 50 displays the indicators in the auto bracketing configurable range 1407, the present displaying process is terminated.

On the other hand, if the number of steps for exposure correction is equal to ⅓ steps, the system controller circuit 50 displays the indicators in the auto bracketing configurable range 1407 at intervals of ⅓ steps within the range between "the exposure correction value−2"(EV) and "the exposure correction value+2"(EV) (S805), followed by terminating the present displaying process.

As described above, in the present embodiment, the display range of indicators in the auto bracketing configurable range 1407 is configured to be set within the range between "the exposure correction value−2"(EV) and "the exposure correction value+2"(EV). This causes the indicator in the center of the auto bracketing configurable range 1407 to be always positioned opposed to the indicator indicative of the exposure correction value. Therefore, in setting auto bracketing values, it becomes possible to instantly recognize how an effect of the whole exposure correction is changed while taking into account an exposure correction to be caused by the setting of the auto bracketing values.

In other words, it is possible to set auto bracketing values while confirming the whole range of exposure configurable for correction in which possible exposure corrections are taken into account.

Next, a description will be given of details of a process executed in the step S405 in FIG. 4, for displaying exposure correction/auto bracketing values, with reference to the flowchart in FIG. 9.

In the process for displaying exposure correction/auto bracketing values, the system controller circuit 50 determines a setting of the bracketing configuration permission flag (S901). As a result, if the bracketing configuration permission flag is equal to the value indicative of "inhibited", the system controller circuit 50 displays the exposure correction cursor 1409 at a position of an indicator indicative of the exposure correction value in the exposure correction configurable range 1406 (S902), followed by terminating the present displaying process.

On the other hand, if the bracketing configuration permission flag is equal to the value indicative of "permitted", the system controller circuit 50 displays the underexposed-side bracket cursor 1408 at a position of an indicator indicative of "the exposure correction value—the absolute value of an underexposure-side auto bracketing value" out of the indicators in the auto bracketing configurable range 1407 (S903). Further, the system controller circuit 50 displays the overexposed-side bracket cursor 1410 at a position of an indicator indicative of "the exposure correction value+the absolute value of an overexposure-side auto bracketing value" out of the indicators in the auto bracketing configurable range 1407 (S904).

Next, the system controller circuit 50 displays the exposure correction cursor 1409 in a manner overlapping the indicator indicative of the exposure correction value in the exposure correction configurable range 1406 and the indicator (indicator in the center) in the auto bracketing configurable range 1407 opposed to the indicator of the exposure correction value (S905), followed by terminating the present displaying process.

According to the above-described process, in a state in which the exposure correction cursor 1409 is displayed at the position of the indicator in the center of the auto bracketing configurable range 1407, the underexposed-side bracket cursor 1408 and the overexposed-side bracket cursor 1410 are displayed on opposite sides of the exposure correction cursor 1409. This makes it possible for the user who is about to set auto bracketing values to easily grasp the effect of the whole exposure correction in which the setting of an exposure correction value is taken into account. Further, it also becomes possible for the user to easily grasp a degree of deviation of auto bracketing values from the exposure correction value.

Figure 10:
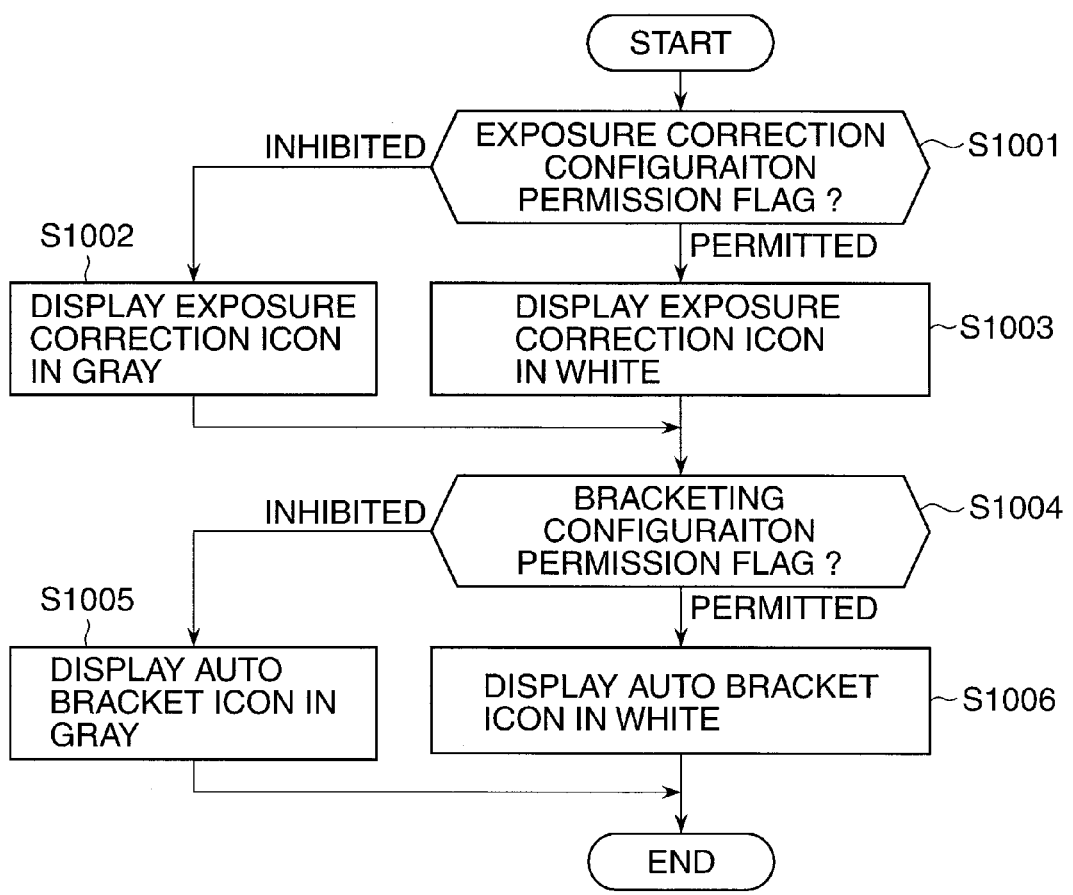
FIG. 10 is a flowchart of details of a guidance-displaying process executed in FIG. 4.

Next, a description will be given of details of a guidance-displaying process executed in the step S406 in FIG. 4 with reference to the flowchart in FIG. 10.

In the guidance-displaying process, the system controller circuit 50 determines a setting of the exposure correction configuration permission flag (S1001). As a result, if the exposure correction configuration permission flag is equal to the value indicative of "inhibited", the system controller circuit 50 displays the "+/−" icon 1401 associated with the exposure correction, and the guidance icon 1403 in gray (S1002), and then the process proceeds to a step S1004, referred to hereinafter.

On the other hand, if the exposure correction configuration permission flag is equal to the value indicative of "permitted", the system controller circuit 50 displays the "+/−" icon 1401 associated with the exposure correction, and the guidance icon 1403 in white (S1003), and then the process proceeds to the step S1004.

In S1004, the system controller circuit 50 determines a setting of the bracketing configuration permission flag. As a result, if the bracketing configuration permission flag is equal to the value indicative of "inhibited", the system controller circuit 50 displays the "AEB" icon 1402 associated with bracketing and the guidance icon 1404 in gray (S1005).

On the other hand, if the bracketing configuration permission flag is equal to the value indicative of "permitted", the system controller circuit 50 displays the "AEB" icon 1402 associated with bracketing and the guidance icon 1404 in white (S1006).

It should be noted that during a time period over which the guidance icons 1403 and 1404 are displayed in gray, even if the sub electronic dial 116 and the main electronic dial 411 are operated, the operations are rejected as invalid by the system controller circuit 50.

As described above, the icon for the exposure correction or bracketing which corresponds to a configuration permission flag set to a value indicative of "inhibited" is displayed in gray, whereby it is possible to reduce erroneous operations.

Figure 11:
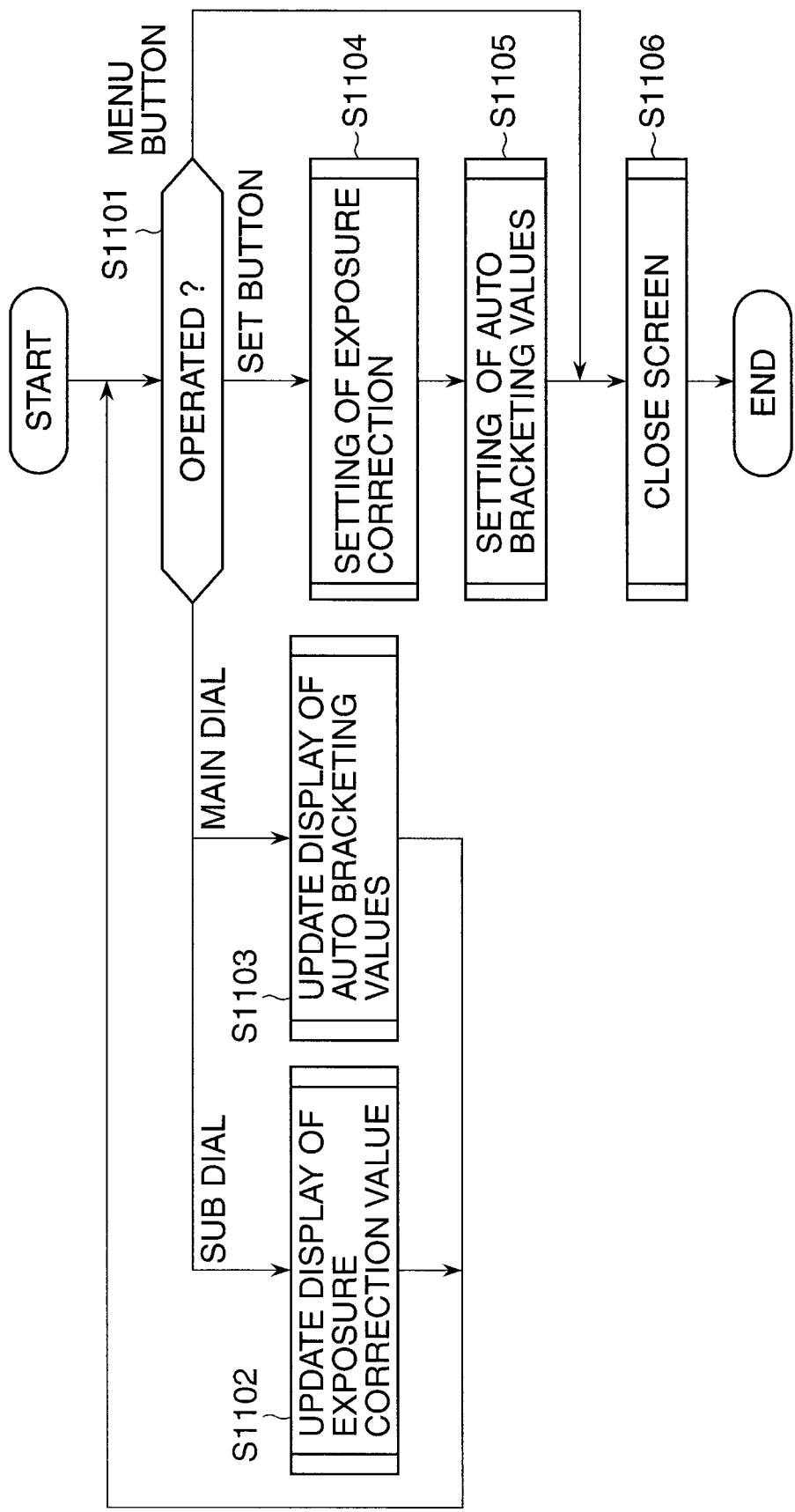
FIG. 11 is a flowchart of a display-updating process executed by a user's operation when the exposure correction/AEB configuration screen is being displayed.

Next, a description will be given of a process in a case where a user operation is performed during display of the exposure correction/AEB configuration screen with reference to the flowchart in FIG. 11.

If the user performs some operation when the exposure correction/AEB configuration screen is being displayed, the system controller circuit 50 determines contents of the operation (S1101). As a result, if the sub electronic dial 116 is operated, the system controller circuit 50 updates the display of the exposure correction value, i.e. the display position of the exposure correction cursor 1409 according to the operation (S1102), and the process returns to a step S1101. The process in S1102 will be described in detail hereinafter with reference to FIG. 12.

If the main electronic dial 411 is operated, the system controller circuit 50 updates the display of the auto bracketing values, i.e. the display positions of the bracket cursors 1408 and 1410 according to the operation (S1103), and the process returns to S1101. The process in S1103 will be described in detail hereinafter with reference to FIG. 13.

If the SET button is operated, the system controller circuit 50 fixes the setting by storing the exposure correction value and the auto bracketing values changed by the dial control, in the nonvolatile memory 56 (S1104 and S1105). Then, the system controller circuit 50 closes the exposure correction/AEB configuration screen (S1106), followed by terminating the present process.

Thereafter, when the auto bracketing shooting is instructed, the shooting is carried out based on the exposure correction value and the auto bracketing values set as above. In the auto bracketing shooting, if the auto bracketing values are not equal to 0, the shooting is automatically performed a plurality of times based on the exposure correction value and the auto bracketing values set as described above, in response to a single operation of the release button 114.

Further, if the operation of the menu button or the shooting operation is performed in the step S1101, the system controller circuit 50 closes the exposure correction/AEB configuration screen (S1106), followed by terminating the present process.

Figure 12:
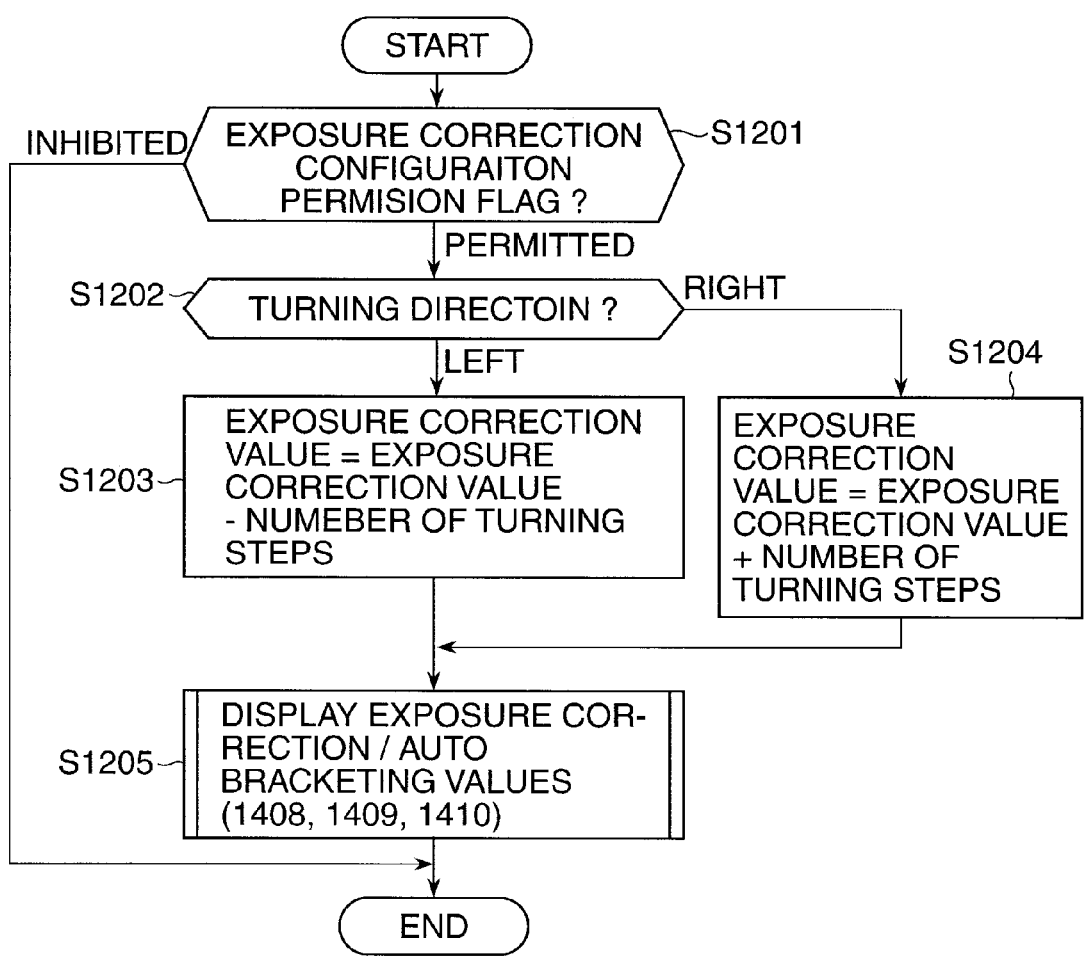
FIG. 12 is a flowchart of details of a process (for changing an exposure correction value when a sub electronic dial is operated) appearing in FIG. 11.

Next, a description will be given of details of a process executed in S1102 in FIG. 11 with reference to a flowchart in FIG. 12.

If the sub electronic dial 116 is operated, the system controller circuit 50 determines a the setting of the exposure correction configuration permission flag (S1201). As a result, if the exposure correction configuration permission flag is equal to the value indicative of "inhibited", the process is terminated without executing any processes.

On the other hand, if the exposure correction configuration permission flag is equal to the value indicative of "permitted", the system controller circuit 50 determines a turning direction of the sub electronic dial 116 (S1202). As a result, if the sub electronic dial 116 is turned in a left direction, the system controller circuit 50 sets a value obtained by subtracting the number of steps of exposure correction (number of turning steps) dependent on the turning operation from the current exposure correction value, as a new exposure correction value (S1203).

If the sub electronic dial 116 is turned in a right direction, the system controller circuit 50 sets a value obtained by adding the number of steps of exposure correction (a number of turning steps) dependent on the turning operation to the current exposure correction value, as a new exposure correction value (S1204).

Figure 9:
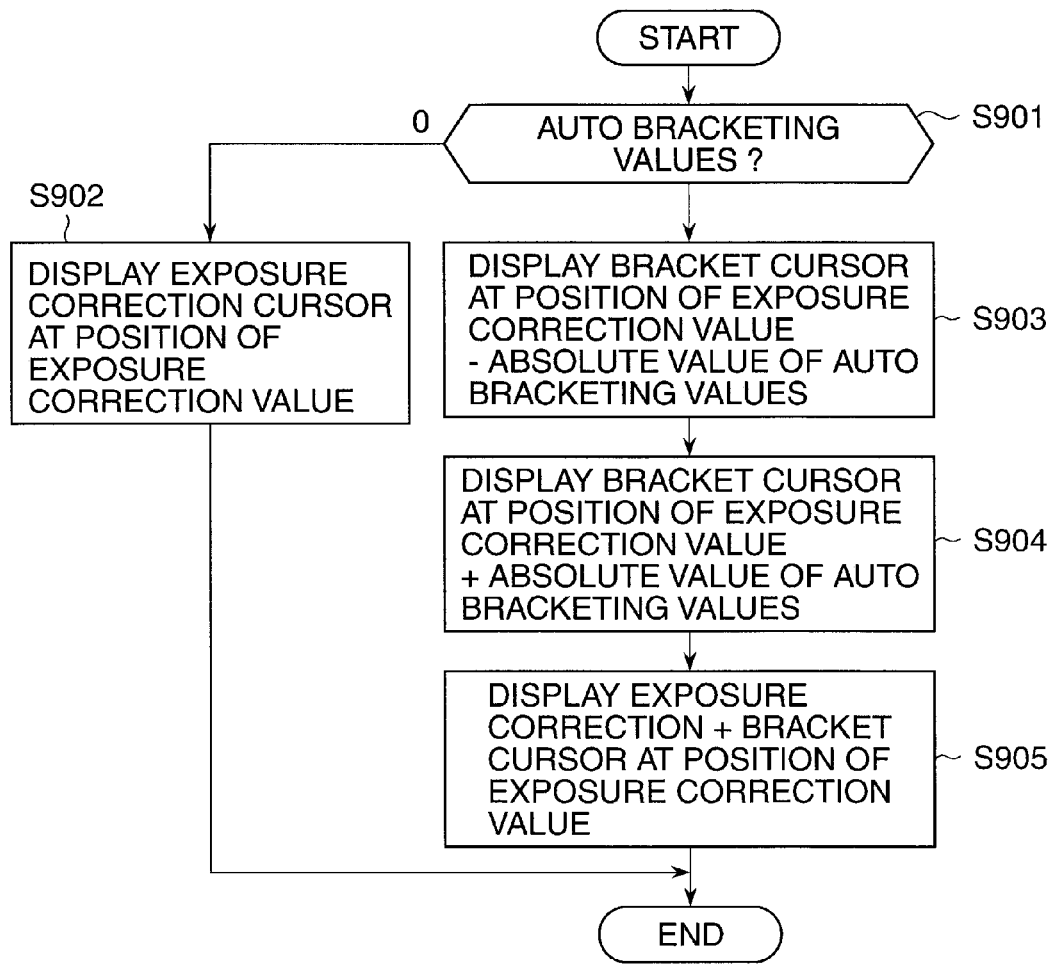
FIG. 9 is a flowchart of details of a process executed in FIG. 4, for displaying exposure correction/auto bracketing values.

Next, the system controller circuit 50 moves the exposure correction cursor 1409 to a position of an indicator indicative of the new exposure correction value by executing the process for displaying the exposure correction/auto bracketing values in FIG. 9 (S1205). In this case, in accordance with moving of the exposure correction cursor 1409, the auto bracketing configurable range 1407, and the bracket cursors 1408 and 1410 which are positioned on opposite sides of the exposure correction cursor 1409 are also moved.

Figure 13:
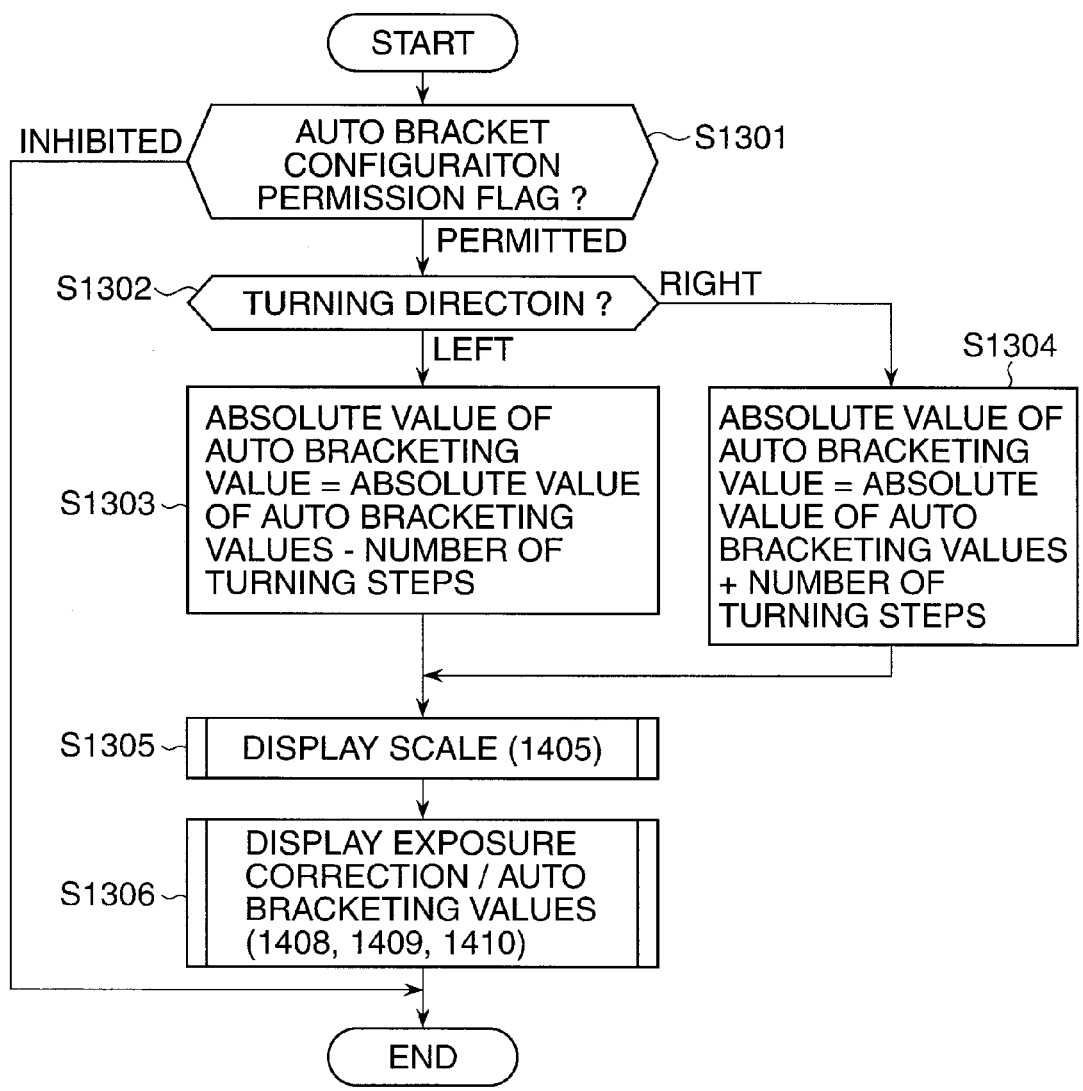
FIG. 13 is a flowchart of details of a process (for changing auto bracketing values when a main electronic dial is operated) appearing in FIG. 11.

Next, a description will be given of details of a process executed in the step S1103 of FIG. 11 with reference to the flowchart in FIG. 13.

If the main electronic dial 411 is operated, the system controller circuit 50 determines a setting of the bracketing configuration permission flag (S1301). As a result, if the bracketing configuration permission flag is equal to the value indicative of "inhibited", the process is terminated without executing any processes.

On the other hand, if the bracketing configuration permission flag is equal to the value of "permitted", the system controller circuit 50 determines a turning direction of the main electronic dial 411 (S1302). As a result, if the main electronic dial 411 is turned in a left direction, the system controller circuit 50 sets a value obtained by subtracting the number of steps of bracketing dependent on the turning operation from the absolute value of current underexposure-side and overexposure-side auto bracketing values, as the absolute value of new underexposure-side and overexposure-side auto bracketing values (S1303). If the main electronic dial 411 is turned in a right direction, the system controller circuit 50 sets a value obtained by adding the number of steps of bracketing dependent on the turning operation to the current underexposure-side and overexposure-side auto bracketing values, as the absolute value of new underexposure-side and overexposure-side auto bracketing values (S1304).

Figure 5:
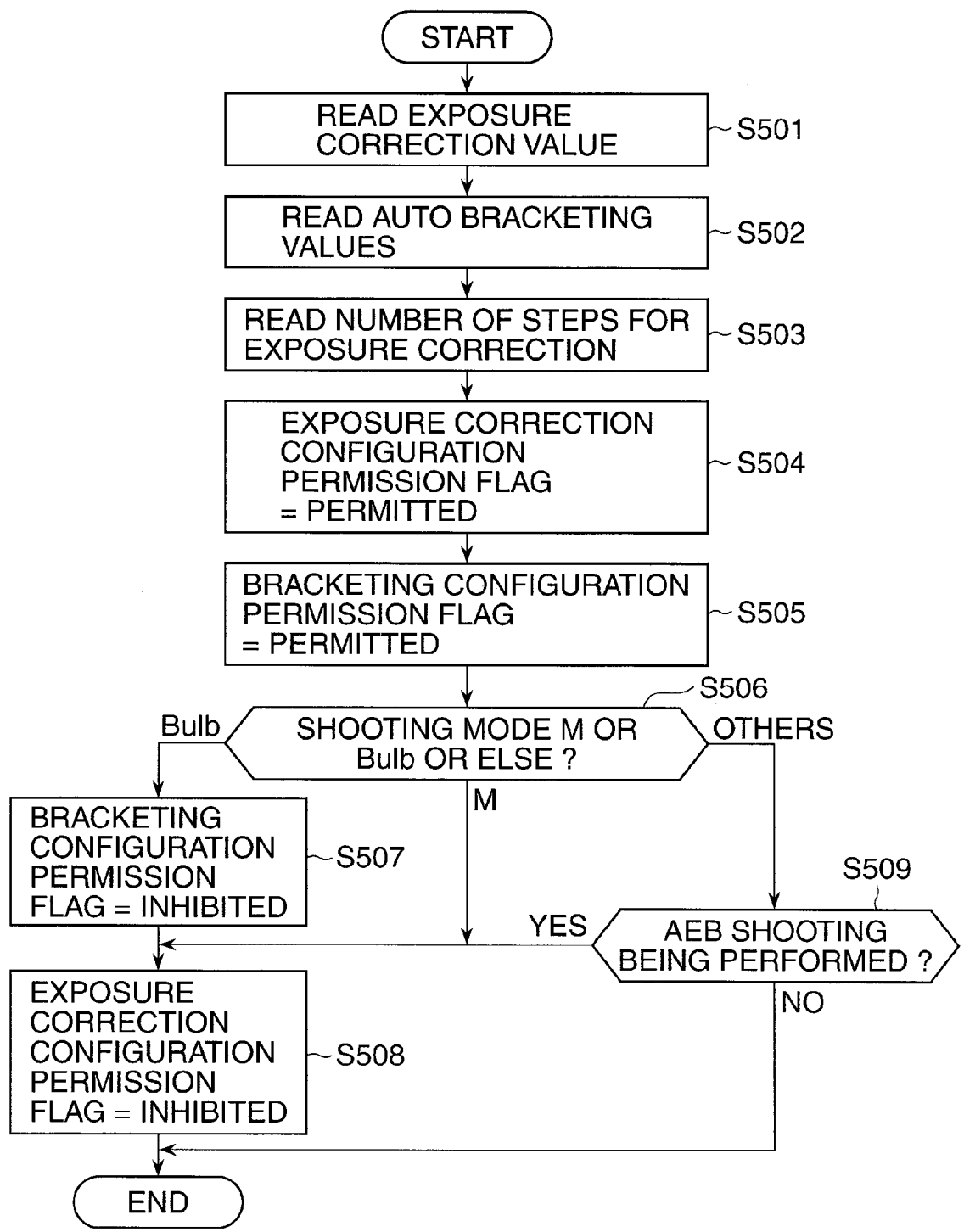
FIG. 5 is a flowchart of details of a data acquisition process executed in FIG. 4.

Next, the system controller circuit 50 executes the scale-displaying process in FIG. 5 (S1305). The scale displaying process is executed since there is a possibility that it is required to change the range of the scale 1405 between "−4EV to +4EV" and "−2EV to +2EV".

Next, the system controller circuit 50 shifts the bracket cursors 1408 and 1410 to respective positions of indicators corresponding to the new auto bracketing values by executing the process for displaying exposure correction/auto bracketing values in FIG. 9 (S1206).

Here, variations of display of the exposure correction/AEB configuration screen are shown in FIGS. 17A to 17I. It should be noted that in FIGS. 17A to 17I, the "+/−" icon 1401, the "AEB" icon 1402, and the guidance icons 1403 and 1404 displayed in gray are represented by dotted lines.

Figure 17A:
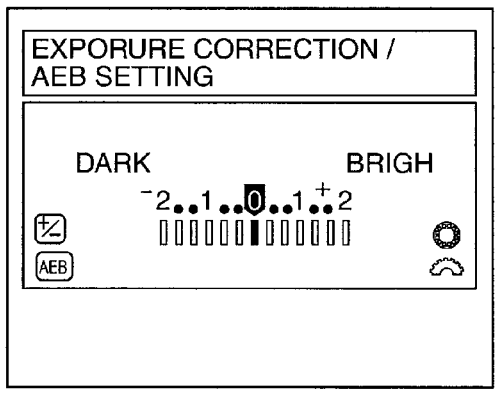

FIG. 17A shows the exposure correction/AEB configuration screen in a case where both of the exposure correction configuration and the bracketing configuration are possible; the exposure correction value is equal to 0; the auto bracketing values are equal to 0; and the number of steps for exposure correction is equal to ⅓ steps.

Figure 17B:
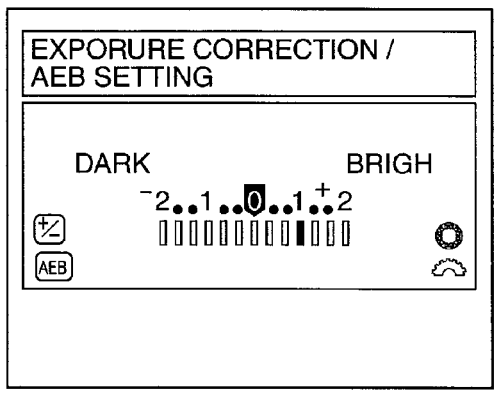

FIG. 17B shows the exposure correction/AEB configuration screen in a case where both of the exposure correction configuration and the bracketing configuration are possible; the exposure correction value is equal to "1"; the auto bracketing values are equal to 0; and the number of steps for exposure correction is equal to ⅓ steps.

Figure 17C:
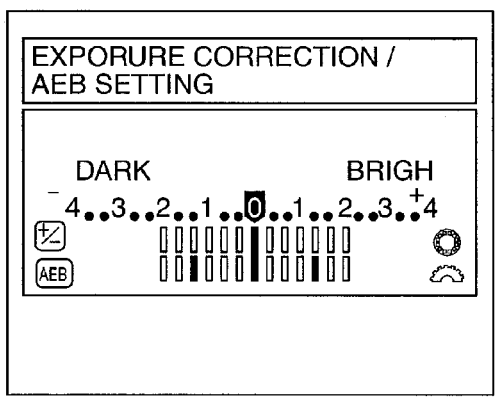

FIG. 17C shows the exposure correction/AEB configuration screen in a case where both of the exposure correction configuration and the bracketing configuration are possible; the exposure correction value is equal to 0; the absolute value of underexposure-side and overexposure-side auto bracketing value is equal to "1+⅓"; and the number of steps for exposure correction is equal to ⅓ steps.

Figure 17D:
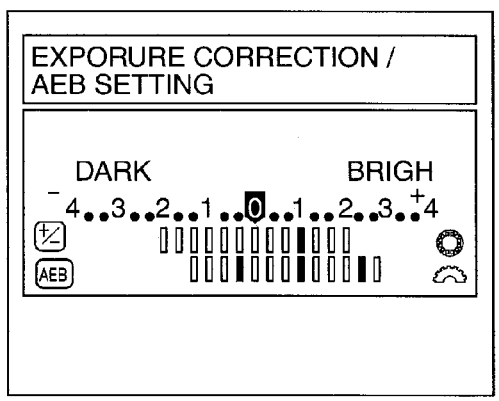

FIG. 17D shows the exposure correction/AEB configuration screen in a case where both of the exposure correction configuration and the bracketing configuration are possible; the exposure correction value is equal to "1"; the absolute value of underexposure-side and overexposure-side auto bracketing value is equal to "1+⅓"; and the number of steps for exposure correction is equal to ⅓ steps.

Figure 17E:
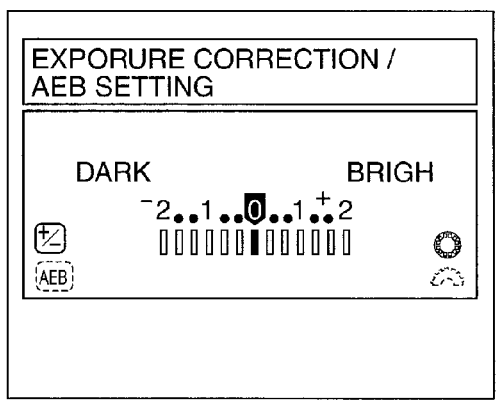

FIG. 17E shows the exposure correction/AEB configuration screen in a case where the exposure correction configuration is possible; the bracketing configuration is impossible; the exposure correction value is equal to 0; and the number of steps for exposure correction is equal to ⅓ steps. Since the bracketing configuration is impossible, the "AEB" icon and the guidance icon indicative of the main electronic dial 411 are displayed in gray, so that this manner of display makes it identifiable that the bracketing configuration is impossible, as distinct from FIG. 17A.

Figure 17F:
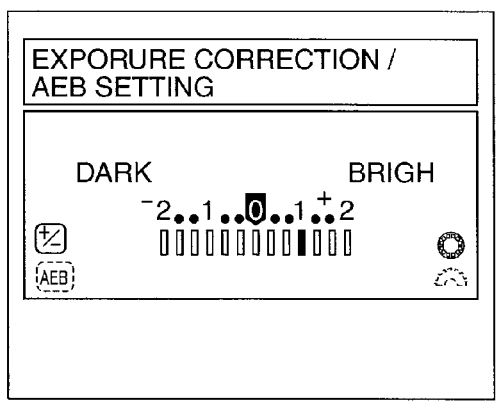

FIG. 17F shows the exposure correction/AEB configuration screen in a case where the exposure correction configuration is possible; the bracketing configuration is impossible; the exposure correction values is equal to "1"; and the number of steps for exposure correction is equal to ⅓ steps.

FIG. 17G shows the exposure correction/AEB configuration screen in a case where the exposure correction configuration is impossible; the bracketing configuration is possible; the auto bracketing values are equal to 0; and the number of steps for exposure correction is equal to ⅓ steps. Since the exposure correction configuration is impossible, the exposure correction configurable range, the "+/−" icon and the guidance icon indicative of the sub electronic dial 116 are displayed in gray, so that the displaying manner makes it identifiable that the exposure correction configuration is impossible, as distinct from FIG. 17A.

FIG. 17H shows the exposure correction/AEB configuration screen in a case where the exposure correction configuration is impossible; the bracketing configuration is possible; the absolute value of underexposure-side and overexposure-side auto bracketing value is equal to "1+⅓"; and the number of steps for exposure correction is equal to ⅓ steps.

FIG. 17I shows the exposure correction/AEB configuration screen in a case where both of the exposure correction configuration and the bracketing configuration are impossible.

The present embodiment makes easily recognizable the following: The scale 1405 shows a range of exposure correction in an easily recognizable manner while taking into account both the exposure correction and bracketing which are to be set. The reference value (appropriate exposure value) 1414 as the value in the center of the exposure correction range is shown in an easily recognizable manner.

Further, the exposure correction configurable range 1406 and the auto bracketing configurable range 1407 can be recognized by their association with the scale 1405, i.e. in a state in which the exposure correction and the bracketing which are to be set are both taken into account. Further, it is also possible recognize the relationship between the exposure correction configurable range 1406 and the auto bracketing configurable range 1407.

The "+/−" icon 1401 and the "AEB" icon 1402 for guidance make it possible to identify the respective displays as associated with the exposure correction and the bracketing configuration. Further, the guidance icons 1403 and 1404 make it possible to easily understand how to configure the exposure correction and the bracketing.

It should be noted that although in the above-described embodiment, the number of shooting frames in AEB shooting is a total of 3 frames comprised of one at an underexposed value, one at an exposure correction value, and one at an overexposed value, it is also possible to apply the technique according to the above-described embodiment to a case where four frames or more are shot in AEB shooting.

Further, although in the above-described embodiment, the exposure correction/AEB configuration screen is displayed by the operation of the menu button 68, it is also possible to display the exposure correction/AEB configuration screen by the operation of an operating piece other than the menu button 68. Further, it is also possible to set the exposure correction value and the auto bracketing value by operating pieces other than the sub electronic dial 116 and the main electronic dial 411. As the operating pieces in this case, it is possible to use an arrow key, a multi-controller, and further an icon enabling a touch operation or the like. When the icon enabling a touch operation is used, it is preferable that the shape of the icon is formed into the same shape as the sub electronic dial 116 and the main electronic dial 411. This is because it is possible to prevent the user from confusing the operating pieces between the case of using the icon enabling a touch operation, and the case of using the physical sub electronic dial 116 and the main electronic dial 411, as much as possible, when the user sets the exposure correction value and the auto bracketing value.

Further, it is also possible to change and determine the exposure correction value and the auto bracketing value without finally determining the exposure correction value and the auto bracketing value by the operation of the SET button 117. Further, markings and indicators are not necessarily required to be displayed at respective equally-spaced intervals, but their intervals may be configured to be unequal in view of visibility, operability, etc. Further, it is possible to display the exposure correction/AEB configuration screen not only on the display device of the camera main unit, but also on a display device, such as a display of a PC, wireless equipment, and a television or the like, which are connected to the camera main unit.

It should be noted that although in the above-described embodiment, the example in which the present invention is applied to the exposure correction and the exposure auto bracketing has been described, this is not limitative. The present invention can be applied to any other display processing apparatus insofar as the apparatus is for using the shooting condition correction function for correcting an appropriate preset value associated with the shooting conditions calculated based on the measured values, and the auto exposure bracketing function which automatically performs shooting a plurality of frames with a plurality of preset values including corrected shooting condition correction value.

For example, the present invention can be applied to a display processing apparatus for using a lighting control correction function concerning strobe shooting, and lighting control auto bracketing function. In this case, it is only required to provide markings associated with all amounts of light that can be set in a case where the lighting control correction function is used in combination with the lighting control auto bracketing function on the scale 1405 appearing in FIG. 14, using the appropriate amount of light calculated based on the photometry by the system controller circuit 50, as the reference value 1414.

Then, indicators in a lighting control correction configurable range are displayed in the area of 1406, and indicators in a lighting control auto bracketing configurable range are displayed in the area of 1407. Then, various icons, guidance indications and the like concerning the lighting control correction may be displayed. Similarly, the present invention can also be applied to a display processing apparatus for using bracket shooting associated with a shutter speed, a diaphragm value, white balance, and ISO speed.

It is to be understood that the present invention may also be realized by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the above described embodiment may be accomplished not only by executing the program code read out by a computer, but also by causing an OS (operating system) or the like which operates on the computer to perform a part or all of the actual operations based on instructions of the program code.

Further, it is to be understood that the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-205980 filed Aug. 8, 2008, which is hereby incorporated by reference herein in its entirety.

What is claimed is:

1. A display processing apparatus comprising:
a correction setting unit adapted to set a value of specific shooting configuration to a correction value corrected based on an instruction from a user;
an auto bracketing value-setting unit adapted to set auto bracketing values in auto bracketing shooting based on an instruction from the user; and
a display processing unit adapted to carry out a process for displaying a scale for indicating at least values set by said correction setting unit, first indicators indicative of a range of values which can be set by said correction setting unit, which are arranged in a manner associated with the scale, and second indicators indicative of a range of values which can be set by said auto bracketing value-setting unit, which are arranged in a manner associated with the scale and the first indicators,
wherein the scale further indicates values set by said auto bracketing value-setting unit, and
wherein the scale, the first indicators, and the second indicators are displayed in the same display.

2. The display processing apparatus according to claim 1, wherein the specific shooting configuration is at least one of configurations of exposure, lighting control, shutter speed, a diaphragm value, white balance, and ISO speed.

3. The display processing apparatus according to claim 1, wherein said display processing unit displays the second indicators by arranging the second indications such that a position corresponding to the correction value set by said correction setting unit is in a center.

4. The display processing apparatus according to claim 1, wherein said display processing unit changes a manner of displaying the first indicators depending on whether or not shooting using the correction value set by said correction setting unit is possible.

5. The display processing apparatus according to claim 1, wherein said display processing unit changes a manner of displaying the second indicators depending on whether or not the auto bracketing shooting is possible.

6. The display processing apparatus according to claim 1, wherein said display processing unit displays a position indicative of the correction value set by said correction setting unit, out of the first indicators, in a manner discernible from other positions of the first indicators.

7. The display processing apparatus according to claim 6, wherein said display processing unit displays the first indicators and the second indicators in a manner such that association between a position indicative of the correction value set by said correction setting unit, out of the first indicators, and the second indicators, is discernible.

8. The display processing apparatus according to claim 1, wherein said display processing unit displays positions indicative of the auto bracketing values set by said auto bracketing value-setting unit, out of the second indicators, in a manner discernible from other positions of the second indicators.

9. The display processing apparatus according to claim 1, wherein said display processing unit further displays guidance information concerning setting by said correction setting unit in a vicinity of the first indicators.

10. The display processing apparatus according to claim 1, wherein said display processing unit further displays guidance information concerning setting by said auto bracketing value-setting unit in a vicinity of the second indicators.

11. The display processing apparatus according to claim 1, further comprising an image pickup unit adapted to perform the auto bracketing shooting using the correction value set by said correction setting unit.

12. A display processing method comprising:
- setting a value of specific shooting configuration to a correction value corrected based on an instruction from a user;
- setting auto bracketing values in auto bracketing shooting based on an instruction from the user; and
- carrying out a process for displaying, in the same display, a scale for indicating at least values set by said setting of the correction value, first indicators indicative of a range of values which can be set by said setting of the correction value, which are arranged in a manner associated with the scale, and second indicators indicative of a range of values which can be set by said setting of the auto bracketing values which are arranged in a manner associated with the scale and the first indicators.

13. A non-transitory computer-readable recording medium storing a computer-executable program for causing a computer to function as:
- a correction setting unit adapted to set a value of specific shooting configuration to a correction value corrected based on an instruction from a user;
- an auto bracketing value-setting unit adapted to set auto bracketing values in auto bracketing shooting based on an instruction from the user; and
- a display processing unit adapted to carry out a process for displaying, on the same display, a scale for indicating at least values set by said correction setting unit, first indicators indicative of a range of values which can be set by said correction setting unit, which are arranged in a manner associated with the scale, and second indicators indicative of a range of values which can be set by said auto bracketing value-setting unit, which are arranged in a manner associated with the scale and the first indicators.

* * * * *